(12) United States Patent  
Mini et al.

(10) Patent No.: US 6,684,196 B1
(45) Date of Patent: Jan. 27, 2004

(54) BEGINNING-TO-END ONLINE AUTOMATION OF REAL ESTATE TRANSACTIONS

(75) Inventors: Juan F. Mini, Berkeley, CA (US); Nathaniel A. Brooks, Oakland, CA (US)

(73) Assignee: zipRealty, Inc., Emeryville, CA (US)

(*) Notice: Subject to any disclaimer, the term of this patent is extended or adjusted under 35 U.S.C. 154(b) by 0 days.

(21) Appl. No.: 09/385,697

(22) Filed: Aug. 30, 1999

Related U.S. Application Data

(60) Provisional application No. 60/142,862, filed on Jul. 7, 1999.

(51) Int. Cl.[7] ............................................. G06F 17/60
(52) U.S. Cl. .............................. 705/26; 705/37; 705/14
(58) Field of Search ........................ 705/26, 27, 28, 705/37, 38, 14

(56) References Cited

U.S. PATENT DOCUMENTS

| | | | | |
|---|---|---|---|---|
| 5,032,989 A | * | 7/1991 | Tornetta | 345/667 |
| 5,664,115 A | * | 9/1997 | Fraser | 705/37 |
| 5,794,207 A | * | 8/1998 | Walker et al. | 705/1 |
| 6,330,543 B1 | * | 12/2001 | Kepecs | 705/14 |
| 2001/0005829 A1 | * | 6/2001 | Raveis, Jr. | 705/1 |
| 2001/0039496 A1 | * | 11/2001 | Good et al. | 705/1 |

FOREIGN PATENT DOCUMENTS

WO    WO 97/04410    *    2/1997

OTHER PUBLICATIONS

Internet Publication, www.rbuy.com, May 8, 1999 (from www.archive.com).*
Homebid.com website homepage, Apr. 21, 1999.*
Internet Printout of Homebid.com (print date Oct. 27, 1999), pp. 1–33.*
Internet Printout of Remax.com (print date Feb. 19, 2002), "Moore's Cyberhomes Added to Re/Max Web Site" (Feb. 7, 1997).*

* cited by examiner

*Primary Examiner*—James S. McClellan
(74) *Attorney, Agent, or Firm*—Beyer Weaver & Thomas LLP

(57) ABSTRACT

Methods and apparatus are described for facilitating a transaction corresponding to real property between a seller and a buyer via a network. A negotiation relating to the real property between the buyer and the seller is facilitated via the network. Access by at least one of the buyer and the seller via the network to a plurality of real estate services is provided. Each of the plurality of real estate services relates to an aspect of the transaction, and each of the plurality of real estate services is necessary for the transaction to progress.

16 Claims, 27 Drawing Sheets

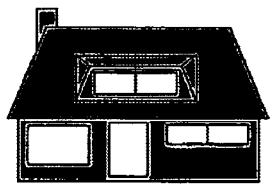

Are you a Homebuyer?

"Wow, zipRealty.com was my one stop shop for my new home purchase needs."

*-Kenny Mikanf and family, third time home buyer*

⇒ Benefits of Buying with zipRealty.com

⇒ Buyers Demo

⇒ Get Started Now!

Are you a Homeseller?

"zipRealty.com was my best agent ever! Our home was sold before we knew it!"

*-Laura Cox and family, third time home seller*

⇒ Benefits of Selling with zipRealty.com

⇒ Sellers Demo

⇒ Get Started Now!

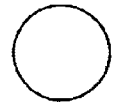

Online Real Estate Broker Support

*FIG. 5*

Easy-To-Use TRANSACTION MANAGER Makes Process Fun For You

In the Next Steps section, the Transaction Manager has organized a way for you to easily go through the 15 steps homebuying process. And, it provides you with ALL the necessary tools and resources that you'll need to successfully complete the purchase of your new home.

In addition to the benefits described regarding your ability to use the One-Stop Shop feature of the Transaction Manger, you also get the following capabilities in our proprietary Transaction Manger:

- Easy-to-use Next Steps section walks you through the homebuying process in just 15 clear steps
- Reduce your stress with our easy-to-understand education program and help center
- View ALL your real estate documents any time of the day or night because they are stored in your Transaction Manager
- Check the status of your transaction via the Transaction Manager 14 hours per day 7 days a week from anywhere in the world
- Complete the required information online to make an offer on a home that interests you 24 hours per day 7 days a week from anywhere in the world
- Find your new home via the Internet and keep track of all homes you have visited in the My Homes area of this powerful Transaction Manager system Take a look at the zipRealty.com Buyers' Demo to get a feel for how the entire process works as you complete each step of the homebuying process with zipRealty.com

Ready to Get Started ?

Click to 

[ Get Started Now! ]

FIG. 6

Hassle-Free ONE STOP SHOP Concept is Convenient For You

We didn't want you to waste time and be frustrated by having to go to each and every website to obtain information about the every third party service you'll need to complete the purchase of your new home. Or, worse yet, we didn't want you to waste hours of your time calling several vendors by phone to research whether or not you would want to do business with them.

Therefore, within our proprietary online Transaction Manger area, you can:

- Locate and view homes on the market for sale
- Research schools and neighborhoods
- Apply for a loan
- Choose an escrow service company
- Obtain title insurance
- Obtain homeowners insurance
- Check local market home values
- Plus lots more Take a look at the benefits of our proprietary Transaction Manger system to discover how we have made it easy for you to complete each step of the homebuying process.

Click on the zipRealty.com Buyers' Demo to get a feel for how the entire process works as you complete each step of the homebuying process with zipRealty.com Ready to
Get Started ?
Click to ⇩

[ Get Started Now! ]

FIG. 7

Save Money

Our commitment is to deliver top-notch service to you at an affordable price. As you complete each step in the zipRealty.com Transaction Manager, you will earn a rebate as a reward for using our online real estate service concept. The total amount of the Rebates Earned varies depending on the total commission received by zipRealty.com and the sales price of the home you are purchasing.

"CASH REBATE BONUSES FOR YOU"

Sales Price: $300,000
Real Estate Commission from Buy Side at 2.5%: $7,500
Total Rebates Earned: $3,000

| Step # | Rebate Per Step | Total Earned Rebates |
|--------|-----------------|----------------------|
| 1      | $500            | $500                 |
| 2      | $100            | $600                 |
| 3      | $100            | $700                 |
| 4      | $200            | $900                 |
| 5      | $200            | $1100                |
| 6      | $100            | $1200                |
| 7      | $300            | $1500                |
| 8      | $200            | $1700                |
| 9      | $500            | $2200                |
| 10     | $100            | $2300                |
| 11     | $250            | $2550                |
| 12     | $100            | $2650                |
| 13     | $550            | $3200                |
| 14     | $100            | $3300                |
| 15     | $200            | $3500                |

Take a look at the zipRealty.com Buyers' Demo to get a feel for how the entire process works as you complete each step of the homebuying process with zipRealty.com.

Ready to Get Started ?

Click to 

[ Get Started Now! ]

FIG. 8

ONLINE REAL ESTATE EXPERTS

You will be represented by an expert Real Estate Broker licensed in your state. Each of our online expert real estate brokers has several years of experience in representing clients in the field. Each broker has been well-trained and is knowledgeable and experienced in representing clients in your area. Additionally, the zipRealty.com Team Concept makes it possible for you to receive a consistent high level of service at each step of the homebuying process. Here's how the Team Concept works to benefit you:

Online Expert Real Estate Brokers

Each customer that registers to buy or sell a home with zipRealty.com chooses an online expert real estate broker, who is responsible for the customer's entire transaction. This broker works at our headquarters as part of a team that handles all the customers in your specific geographic area. The customer contacts the agent via e-mail, telephone or teleconferencing.

Our online expert real estate brokers sole responsibility is to make sure you are satisfied with the homebuying process. Our online brokers do not have to waste time trying to get new business as traditional real estate agents do. They maintain their focus on helping the providing service to you as well as coordinating the efforts of the entire team to work on your behalf.

Local Field Agents

Our local Field Agents are available to assist you in completing required activities such as showing property and doing a due diligence inspection of the property, if necessary. All of our local Field Agents are licensed real estate agents in your state and dedicated to serving you.

Customer Service Representatives

For the activities, tasks and questions that you may have of a general nature, we have a staff of knowledgeable and friendly customer service representatives who will be available for you to call and assist you.

With the Team Concept, all team members that are assigned to work on your real estate transaction, under the direction of the online real estate expert that you choose, are committed and dedicated to making sure you have a great experience when buying your home.

Take a look at the zipRealty.com Buyers' Demo to get a feel for how the entire process works as you complete each step of the homebuying process with zipRealty.com.

Ready to Get Started?

Click to 

[ Get Started Now! ]

FIG. 9

NOTIFICATION OF INTENT
TO PURCHASE REAL PROPERTY

Property located at _____ City _____
State ___
County _____

The accepted bid submitted by the bidder, also known as the prospective buyer(s), is not binding until the purchase agreement is received within 48 hours with a minimum earnest money deposit of 1% of the bid price and it is signed by the seller(s) and acceptance has been communicated to the buyer(s) agent.

SELLER(S) REQUIREMENTS FOR THE SALE

The items completed below are non-negotiable requirements of the sale. Bidders should review these items and submit their bids accordingly. Only the items completed and checked apply.

Property is being sold:
    ___ In present "As Is" condition.
    ___ Pest Control Report will be cleared by seller prior to closing.
    ___ Amount of existing pest control report will be credited to buyer.
Closing to be within ___ days of accepted offer (drop down menu up to 90 days).
All city, county and state transfer taxes, if applicable, are paid as follows: ___% Buyer ___% Seller.
Seller will credit buyer(s) for closing costs an amount not to exceed $ _____.
Seller will credit buyer(s) for repairs or upgrades an amount not to exceed $ _____.
Seller will need the flexibility to rentback the property after the closing for up to ___ days at Buyer(s)' prorated Principal Interest Taxes and Insurance daily rate.
Seller(s) ___ will or ___ will not accept a purchase agreement contingent on sale of buyer's home.

The following personal property will be included as part of the sale:

___ refrigerator ___ washer ___ dryer ___ freezer ___ satellite dish ___ (fill in blank area)

Minimum Price Requested by Seller(s): $_____

Important Notes:
Within 48 hours of acceptance of your bid, the approved bidder must submit a pre-approval letter from a lending institution along with the purchase agreement and a minimum earnest money deposit of one percent (1%) of the purchase price.
Buyer(s) must read and sign all disclosures, reports and other information available at the time the Purchase Agreement is submitted at part of the package submitted in the previous note. These documents should be obtained from your Agent prior to you completing the purchase agreement.

Buyer(s) agree to the terms set forth in these procedures. The bid price for this property is $_____.

No representation is made as to the legal validity or adequacy of any provision in any specific transaction. Real Estate Brokers are qualified to advise on real estate transactions. If you desire legal or tax advice, you should consult the appropriate professional.

© 1999 zipRealty.com. All rights reserved in all media formats. Patent Pending.

FIG. 16A

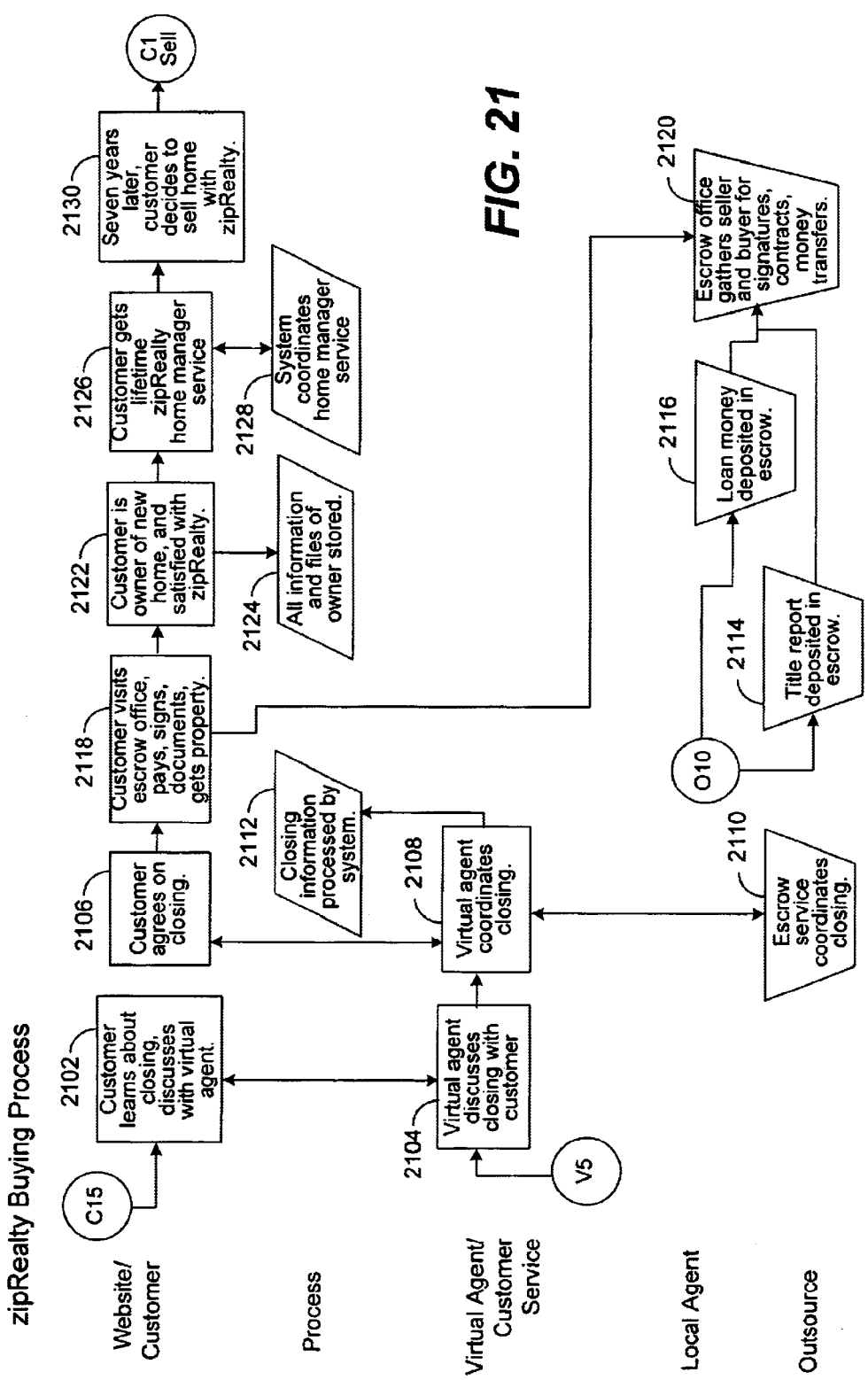

| Transaction Manager | Rebate Earned: $1,200 |

Hi Laura! While looking for homes, let me help you stress less along the way. You have completed Step 5 of 15 Steps. Please continue with Next Step.

My Agent
Maria

Agent Profile:

| Here is your next step | | My Folder |

→ Step 6: Reducing Your Stress during the Process

You will be given vital information about the three critical periods in the homebuying process that seem to cause the most stress for the buyer.

→ ( Go! )

Important: You will be able to make the necessary adjustments and properly prepare yourself during the transaction.

📁 My Documents

✉ My E-mail

| Resources |

☑ View Checklist
Look at all the steps

☑ Find Homes
See all available homes

☑ Neighborhoods
Search neighborhoods

☑ Loan Center
Find the best loan for you

☑ Other Services
Get title, escrow and insurance here

☑ Help Desk

| My Homes |

| MLS# | Street | City | Status | View | Comment | Grade |
|------|--------|------|--------|------|---------|-------|
| 2734 | Field Dr. | San Jose | Available | 📷 | 📄 | ☑ |
| 3785 | Main St. | San Jose | Available | 📷 | 📄 | ☑ |
| 5947 | Court Ave. | San Jose | Available | 📷 | 📄 | ☑ |
| 3785 | Main St. | San Jose | Available | 📷 | 📄 | ☑ |
| 5947 | Court Ave. | San Jose | Available | 📷 | 📄 | ☑ |

*FIG. 22*

BEGINNING-TO-END ONLINE AUTOMATION OF REAL ESTATE TRANSACTIONS

RELATED APPLICATION DATA

This application claims priority from U.S. Provisional Patent Application No. 60/142,862 for ONLINE FACILITATION OF REAL ESTATE TRANSACTIONS filed on Jul. 7, 1999, the entirety of which is incorporated herein by reference for all purposes.

BACKGROUND OF THE INVENTION

The present invention relates to facilitating transactions between remote parties via a network. More specifically, the present invention provides methods and apparatus for facilitating real estate transactions from beginning to end via the Internet.

Engaging in online economic activity via the Internet is becoming increasingly common. Electronic commerce (e-commerce) web sites and e-commerce applications are rapidly proliferating. Internet users can, among other things, bank, invest, buy and sell goods and services, and engage in a wide variety of forms of entertainment online. On some e-commerce sites consumers can specify details about a desired product and consummate a transaction as long as the level of complexity of the transaction is relatively low.

One area of commerce which has not yet fully taken advantage of the potential of the Internet is the real estate market, and, in particular, the residential real estate market. This is true for a couple of reasons. First, real estate, especially residential real estate, is being bought and sold according to a decades old paradigm. That is, the key players in the industry, realtors, mortgage brokers, and title companies, are fairly conservative, somewhat technically unsophisticated, and generally reluctant to embrace change. This results in a process which, for many home sellers and buyers, is shrouded in mystery, appearing arcane and convoluted, not to mention inefficient, inconvenient and expensive.

Second, because of the high level of complexity, remote online facilitation of real estate transactions is a challenging endeavor. That is, in order to facilitate a residential real estate transaction from beginning to end, the conservative players in the industry must be made to work in a coordinated way and, in some cases, against their own perceived interests, to make the home selling and buying process understandable and user friendly. To date, this has not been accomplished.

Rather, for example, when someone wants to buy a home under the current paradigm, not only must they spend inordinate amounts of time attending open houses and meeting with their real estate agent, they must also meet and communicate with mortgage brokers, lending institutions, title companies, and escrow officers. If the process is being engaged in from a geographically remote location, these inconveniences are only exacerbated. In short, despite the rapid advancement of technology in many areas of commerce, buying or selling a home today can be a very frustrating, inefficient, and time consuming process.

That is not to say that there have not been some attempts to modernize the process. Information technology is sometimes used in the process in a peripheral sense, but is not central to the typical residential real estate transaction. For example, some real estate agents have an online presence, using web sites for providing information to prospective buyers and sellers. Online automation of the loan brokering process is also currently available. However, none of the real estate related sites currently accessible online do more than facilitate one or more of the many steps in buying or selling a home. That is, none can take the buyer or seller through the entire transaction.

Even on the few sites that allow buyers to submit initial bids online, once the bid is submitted, the transaction proceeds offline in the traditional manner, typically including several rounds of offer and counteroffer before both parties agree. That is, a bid that is accepted must still follow the traditional non-internet procedures of writing an offer which is then submitted to the seller. The seller may then write a counteroffer to include or exclude terms from the contract. The buyer may then submit a counteroffer of her own if she is not happy with the terms outlined in the seller's counteroffer. Even after the written offer is finally accepted, the same back-and-forth process is often repeated once the buyer conducts inspections. Needless to say, this process is time consuming and inefficient.

In addition, most online bidding processes to date operate such that the actual placement of bids takes place at or near the end of the process. That is, there are no incentives for a buyer to place a bid during the early part of the specified bidding period. This unnecessarily extends the process by several days.

It is therefore desirable to provide an online, streamlined alternative to the current real estate process which allows both buyer and seller to initiate, engage in, and consummate a real estate transaction.

SUMMARY OF THE INVENTION

According to the present invention, methods and apparatus are provided by which a real estate transaction may be initiated and facilitated from beginning to end largely via the Internet. According to various specific embodiments, the present invention provides a "one-stop-shop" for home buyers to find and purchase homes, and for home sellers to list and sell their homes. It replaces the currently prevailing complex and frustrating paradigm with a convenient and technologically advanced one. Both buyers and sellers can take advantage of the advice of experienced, online real estate professionals as they navigate through a clearly explained, multistage process which culminates either in the purchase or sale of their home. It should be noted that while several embodiments of the invention are described herein with reference to residential real estate transactions, the techniques described are equally applicable to commercial real estate transactions.

The personalized transaction manager of the present invention allows the buyer and seller to conveniently complete most of the stages of the transaction online. For example, the buyer may select an agent and identify an appropriate property, even where the target neighborhood is a great distance from the buyer's current residence. The transaction manager also provides access for both buyer and seller to a variety of real estate services relating to the various stages of the transaction. For example, the buyer can apply for financing, homeowner's insurance, and title insurance using the transaction manager. The buyer may also schedule inspections and comply with various regulatory requirements. The buyer and seller may engage in complicated negotiations with regard to the selling price of the property as well as many other standard and nonstandard terms and contingencies. The buyer and seller may establish an escrow account for effecting transfer of title. Both buyer and seller may monitor the status of the transaction at any time.

There are a number of advantages for both buyer and seller associated with using a centralized transaction manager to integrate all of these aspects of a real estate transaction. Obviously, convenience is a major benefit in that much of the work may be done on the user's own time, and in that most of the necessary real estate services may be procured from a central access point. This is especially true for buyers who are relocating to remote geographic locations.

According to a specific embodiment, the bidding process of the present invention provides incentives for buyers to place "preemptive" bids and for sellers to accepts such bids before the end of the bidding period. This, in turn, creates early opportunities for an auction type of scenario, e.g., upon submission of the first bid. It will be understood that these features of the invention can reduce the negotiation process by several days over currently existing paradigms.

According to another specific embodiment, the bidding process of the present invention streamlines the negotiation process by allowing the seller to establish "Requirements For The Sale" in the "Notification of Intent to Purchase Real Property" form. This requires prospective buyers to place a bid based on the seller's explicit requirements. Thus, when the contract is subsequently written, most if not all of the terms important to the seller have already been accepted by the buyer. Not only does this feature eliminate much of the traditional back-and-forth negotiating, it also acts to filter out unsuitable bidders thus significantly reducing the length of the transaction process.

In addition, because the user's personal information is captured electronically and stored in a database associated with the central transaction manager, the information may be used to populate the bewildering array of forms associated with the typical real estate transaction. The user is walked through a series of simple questions which elicit much of the information that will be necessary for populating the complex and intimidating forms associated with each stage of the process. For anyone who has either bought or sold a home, it is not difficult to see the benefit of being able to reduce the amount of time and the anxiety associated with filling out forms.

Another benefit of the integrated approach of the present invention relates to the efficiencies which are realized by the streamlined process. These efficiencies represent an economic advantage in that they can be translated into a reduction in transaction costs. A real estate site designed according to the present invention could, for example, take advantage of such efficiencies by having more professional expertise (e.g., real estate lawyers, tax advisers, etc.) available than is practicable at a real estate brokerage operating under the current paradigm. According to one embodiment, these reduced transaction costs may be passed on to users in the form of cash rebates which accrue as selected stages of the transaction are completed.

Another advantage of having a centralized transaction manager is the organization and accessibility of all of the complex information associated with a real estate transaction. As mentioned above, the buyer and seller may check on the status of the transaction at any time. Most of the myriad real estate documents associated with the transaction are available for perusal before and after they have been filled out. Thus, a buyer or seller can review such documents before signing and avoid the situation where they see the documents for the first time when it's time to sign. The accessibility of information also helps alleviate much of the anxiety which results from the sheer immensity of the undertaking, not to mention the Byzantine nature the transaction.

According to one embodiment, this anxiety is further alleviated by the fact that clear explanations of each stage of the transaction are provided. That is, as the user begins each stage of a transaction, she is presented with a clear and concise explanation as to the procedures for as well as the reasons and ramifications for completing the stage.

Thus, the present invention provides methods and apparatus for facilitating a transaction corresponding to real property between a seller and a buyer via a network. A negotiation relating to the real property between the buyer and the seller is facilitated via the network. Access by at least one of the buyer and the seller via the network to a plurality of real estate services is provided. Each of the plurality of real estate services relates to an aspect of the transaction, and each of the plurality of real estate services is necessary for the transaction to progress.

A further understanding of the nature and advantages of the present invention may be realized by reference to the remaining portions of the specification and the drawings.

BRIEF DESCRIPTION OF THE DRAWINGS

FIGS. 5–9 are screen shots showing various pages in the web site of FIGS. 1–4;

FIGS. 10–21 are portions of a process flow diagram illustrating the purchase of a home according to a specific embodiment of the invention;

FIG. 22 is a screen shot showing an example interface associated with a personalized transaction manager according to a specific embodiment of the invention;

DETAILED DESCRIPTION OF SPECIFIC EMBODIMENTS

Figure 1:
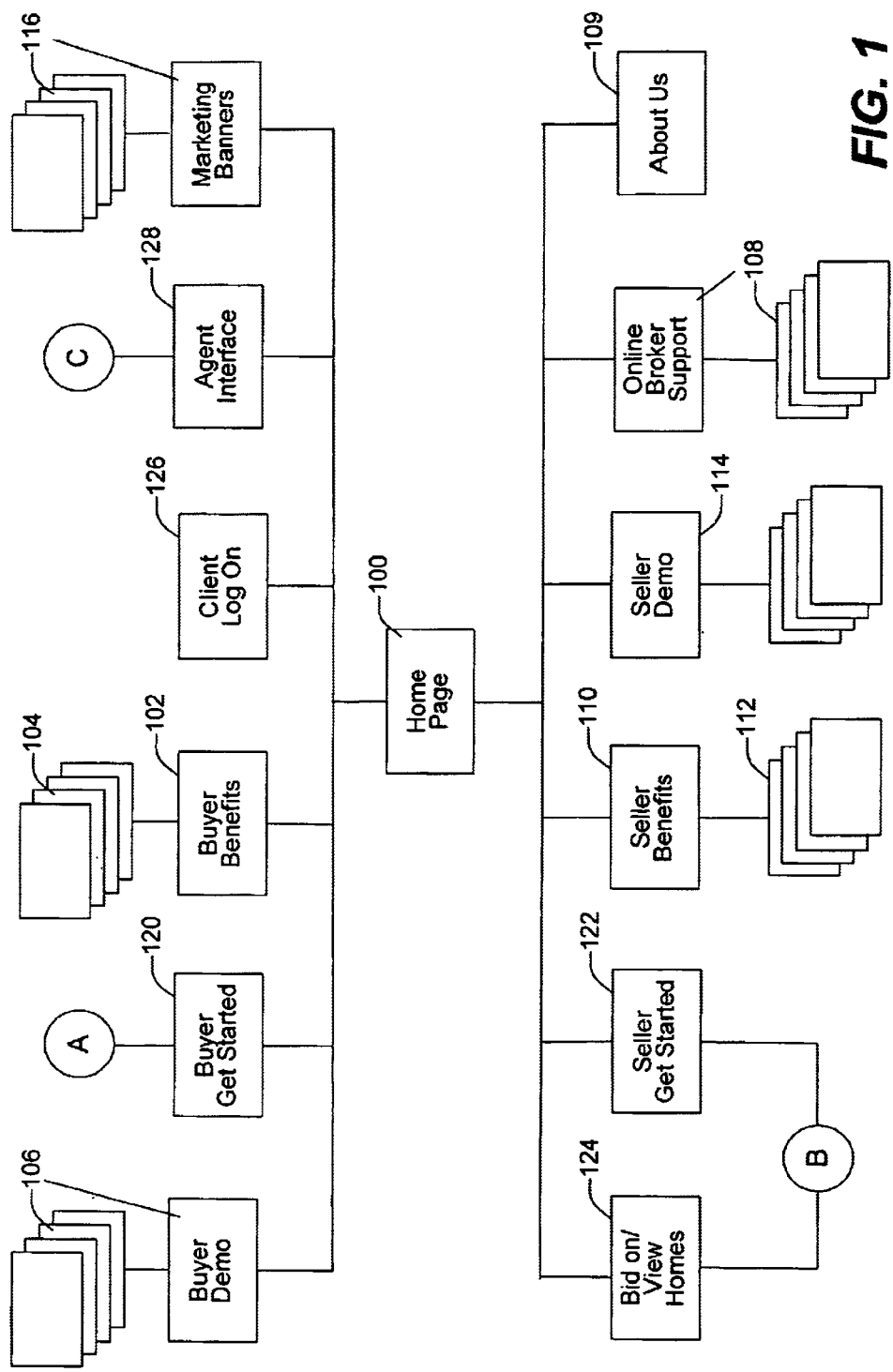
FIGS. 1–4 are portions of a diagram of a web site in which a specific embodiment of the present invention is implemented.

FIGS. 1–4 are portions of a diagram of a web site (with some process flow elements) in which a specific embodiment of the present invention is implemented. FIG. 1 shows the top level of the web site including a home page 100, the graphical user interface of which is depicted in FIG. 5. Home page 100 is the main point of entry to the web site and provides links to a number of other areas of the site via embedded html text and/or icons. For example, a potential buyer may select the "Benefits of Buying" text and gain access to buyer benefits page 102 from which the potential buyer may access further pages 104 which outline the benefits of using the site to purchase a home. Examples of such benefit pages 104 are shown in FIGS. 6–8 which respectively describe the advantages of using the transaction manager, the convenience of the "one stop shop," and the way in which rebates are earned.

Referring back to FIGS. 1 and 5, the potential buyer may select the "Buyers demo" text in home page 100 to access a buyers demonstration 106 which comprises a plurality of pages and which leads the potential buyer through a sample transaction. Selection of the "Online Real Estate Broker Support" text in home page 100 provides access to a series of pages 108 which describe the online availability of expert support (e.g., the screen shot of FIG. 9) as well as information regarding the experience and qualifications of individual real estate professionals who are part of the team supporting the web site. Selection of the "About Us" text provides access to an informational page 109 which discloses information regarding the site administrator.

Home page 100 also has a number of access points for material related to sellers. For example, a potential seller may select the "Benefits of Selling" text to access seller benefits page 110 from which the potential seller may access further pages 112 which outline the benefits of using the site to sell a home. As described above with reference to a potential buyer, a potential seller may also access a demonstration of a sample transaction (pages 114) by selecting the "Sellers Demo" text in home page 100. As with many web sites, various marketing banners 116 (some with e-mail capture capabilities) are sequentially displayed on selected pages of the site including home page 100.

Both buyers and sellers may begin the buying and selling processes 120 and 122, respectively, at home page 100 by selecting their respective "Get Started Now!" text. According to a specific embodiment, potential buyers may also look at available properties and begin the bidding process by selection of a bid banner (not shown) which provides access to a bid on/view homes section of the web site (124). Buyers, sellers, and agents who are already clients of or registered the web site may log onto (126) their own personalized area of the system, i.e., their personalized transaction managers. According to a specific embodiment, both agents associated with the web site and independent agents have access to the system through agent interface 128. This area of the site will be described in greater detail with reference to FIG. 4.

Figure 2:
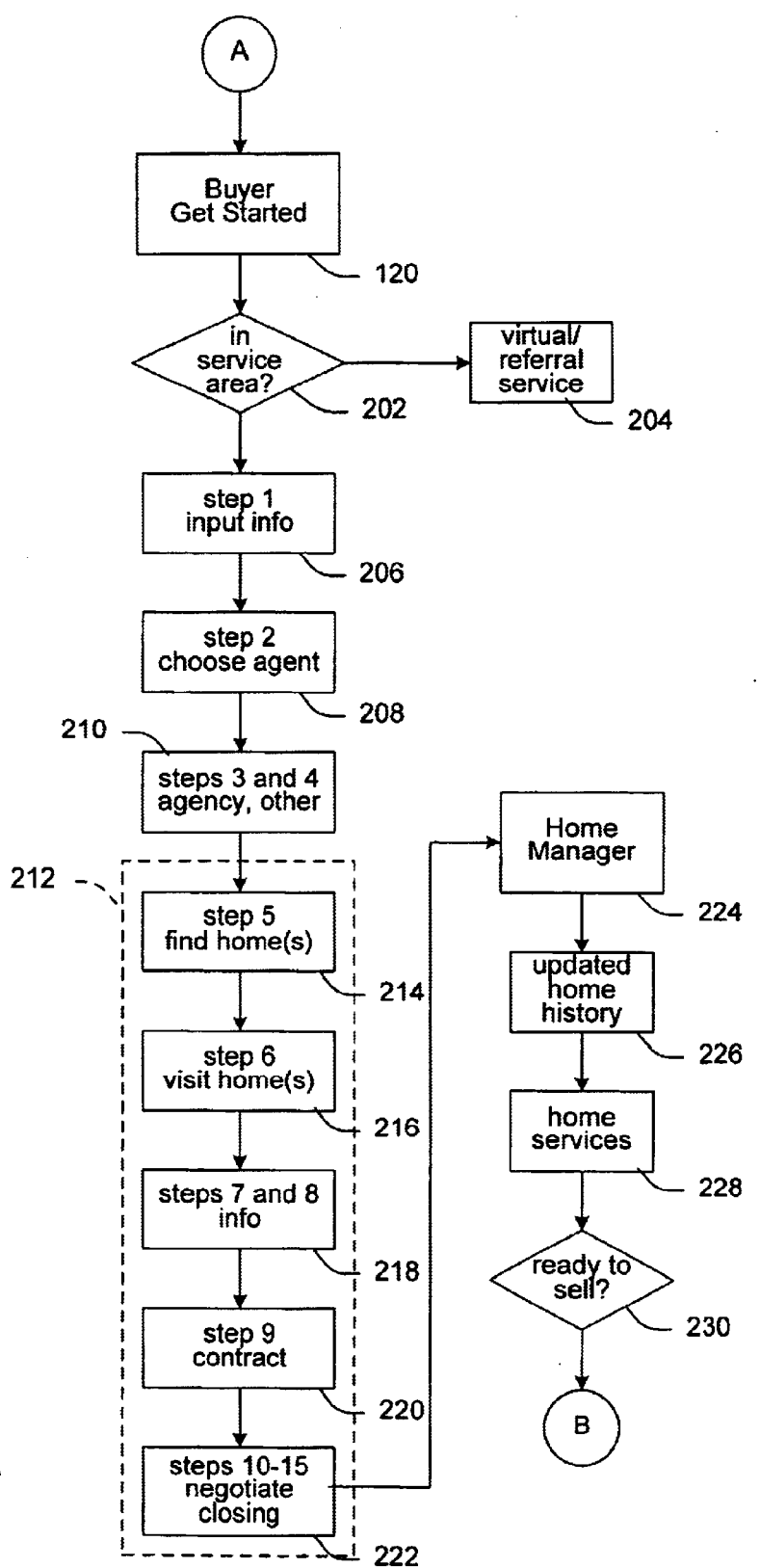

FIG. 2 shows a specific embodiment of buyer process 120. FIG. 2 shows a 15 step home buying process, the details of which are more specifically described with reference to the embodiment of FIGS. 10–21. The potential buyer only moves through the process if she is looking in a geographic area currently being serviced by the web site (block 202). Otherwise, the buyer is provided access to selected virtual and referral services (block 204). For example, information regarding selection of an agent may be provided in addition to contact information for agents in the area of interest. In addition, access to others of the site's services which are not dependent upon geographic location may be provided. Such a service might include a Home Manager service by which a homeowner may track a variety of data relevant to owning and maintaining a home.

If the buyer is looking in a geographic region serviced by the web site (block 202), she is prompted to enter personal information for the purpose of starting the process (block 206). As will be discussed, this information may be used throughout the process to populate any of the large number of forms and documents which are part of a real estate transaction. The buyer is then provided access to information regarding a number of real estate professionals associated with the site from which she can choose an agent to represent her in the transaction (block 208). The buyer is then taken through a series of interfaces in which the nature of the agency to which she is consenting is explained, and her price range is determined (block 210). At this point, the buyer becomes a client of the web site and a personal transaction manager 212 is created by which the buyer will interact with the site from this point forward.

Using the personal transaction manager (an example interface of which is shown in FIG. 22), the buyer may begin the process of finding a home (block 214) using an interface in which the characteristics of the desired home may be specified. These characteristics may include, for example, the price range of interest, the number of bedrooms and bathrooms, etc. Once viable candidates are identified, the buyer may then visit the homes (block 216) and, using the available features in her personalized interface, keep track of the individual properties using a grading scale, the grades of which also serve to indicate to the buyer's virtual agent at the web site the level of the buyer's interest in a given property.

Once the buyer has visited and identified a home she wishes to pursue, she is provided information regarding the process of writing an offer, acceptance of the offer, closing of escrow, and execution of the purchase agreement (block 218). The buyer is then led through the process of actually writing up the offer (block 220). Where the seller is interested in the offer but wants to negotiate some of the terms, the system of the present invention facilitates the negotiation between the buyer and seller all the way to the closing of escrow (block 222). This includes providing advice for the negotiations, scheduling of inspections, providing information regarding the status of financing, homeowners insurance, and the title report, and providing advice regarding the closing itself.

Once the buyer becomes a homeowner, she can take advantage of the Home Manager service 224 provided by the web site. Through the use of Home Manager service 224, the homeowner can track a variety of data related to her new home. She may, for example, track the maintenance or construction history of the structure (block 226). She may also take advantage of a variety of services which are made available through Home Manager 224 (block 228) such as, for example, referrals for architects and contractors, refinancing, etc. And, when the homeowner is ready to sell the property (block 230), she may take advantage of the home selling process provided by the web site, a specific embodiment of which is shown in FIG. 3.

Figure 3:
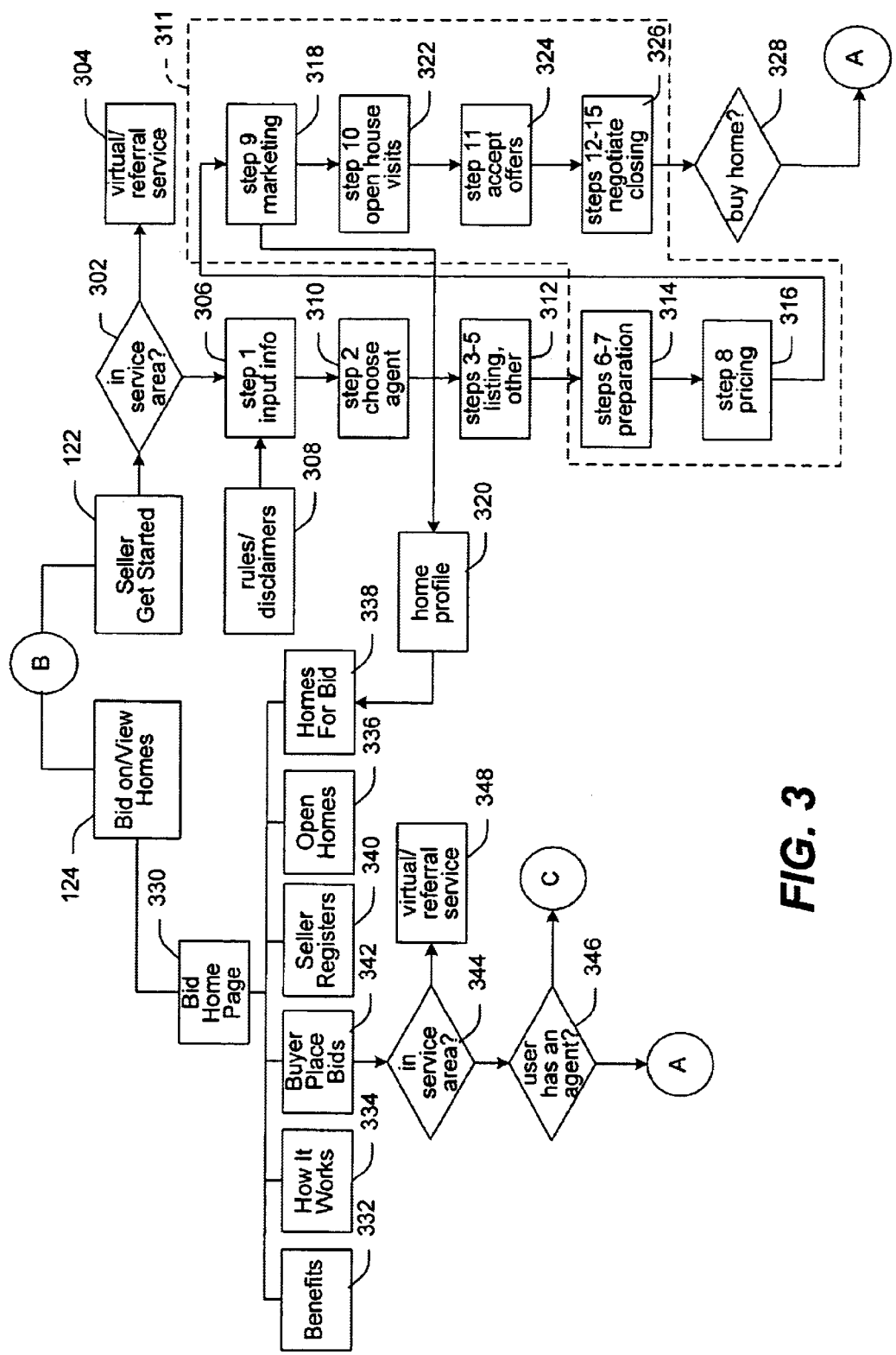

FIG. 3 shows specific embodiments of seller process 122 and bid process 124. Referring first to seller process 122, if the seller's home is not located in a geographic area currently being serviced by the web site (block 302), the seller is provided access to selected virtual and referral services (block 304). For example, information regarding selection of a listing agent may be provided in addition to contact information for agents in the area of interest. If, on the other hand, the seller's home is in a service area, the seller is prompted to enter personal information for the purpose of starting the process (block 306). In this part of the process, the seller is provided with information regarding the rules and procedures governing bidding on a home through the site, as well as any appropriate legal notifications and disclaimers (block 308). The seller is then provided access to information regarding a number of real estate professionals associated with the site from which she can choose an agent to represent her in the transaction (block 310).

Once the seller decides to become a client of the web site, she completes, signs and submits a variety of forms obtained online from the web site to formalize the relationship including, for example, various listing and agency agreements, disclosure forms, authorization forms, etc. (block 312). As discussed herein, the present invention streamlines the forms process for both seller and buyer by requiring that the user input a particular piece of information once, that information being stored in the system database for later use to populate the corresponding field in a subsequent document. At this point, a personalized transaction manager 311 is generated by which the seller will interact with the site going forward. Once the relationship is formalized, the seller engages in a variety of activities in preparation for listing her home on the site (block 314). These activities may include, for example, submitting information about the house to the site including photographs and other detailed information, providing a schedule of times for open houses, performing a pest inspection and submitting the report, etc. The seller may also submit an asking price which she may determine using an application resident on the web site (block 316).

With all of this information, the web site can begin marketing the property (block 318) which includes generating a listing (block 320) and making the listing available via the Internet as well as getting the word out regarding open houses. The seller (or a representative of the web site) then hosts the open houses (block 322) and refers any interested parties to the web site. Offers are received through the web site and, with the assistance of the seller's virtual agent associated with the site, negotiated and accepted (block 324). The seller and her virtual agent then negotiate any contingencies or other matters to facilitate the closing of escrow and the transfer of the property (block 326). Of course, if selling her home puts the seller into the position of being a buyer (block 328), she can take advantage of the home buying process provided by the site.

According to various embodiments of the invention, a revenue model is provided which takes offsets the user's transaction costs by offering savings in the form of rebates. That is, by using the site's online platform, the user is "rewarded" for successively performing steps online because of the efficiencies gained by the online automation of the transaction. According to specific embodiments, the level of the rebate at each stage is based on a variety of parameters including, but not limited to, the value of the home, the commission level in the area, the current climate of the market in the area (seller's market or buyer's market), and various company promotional campaigns which may be global, regional, or local.

Bid On/View Homes link 124 provides a series of interfaces for viewing available listings and entering into the home buying or selling processes provided by the web site of the present invention. A bid home page 330 provides further links to information regarding the benefits of using the site (block 332), and the rules, procedures, and legal information related to the site (block 334). Also provided are links to listings of open houses (block 336) as well as homes for which bids are being accepted (block 338). In addition, sellers may register their home with the site (block 340) so that, even if they are not using the site as their agent, their homes may be purchased via the site.

Bid home page 330 also provides another way in which a buyer may begin the home buying process. When a potential buyer elects to make a bid on a home through the site (block 342), the home is in a geographic area serviced by the site (block 344), and the buyer does not have an agent (block 346), the buyer is provided access to the site's buyer process such as, for example, the process described above with reference to FIG. 2. If the buyer already has an agent (block 346) she is directed toward the agent section of the web site (see FIG. 4) where her agent can register with the site and conduct business for her client through the site. If the geographic region in which the buyer is interested is not currently being serviced by the web site (block 344), the buyer is provided access to selected virtual and referral services (block 348). For example, information regarding selection of an agent may be provided in addition to contact information for agents in the area of interest. In addition, access to others of the site's services which are not dependent upon geographic location may be provided.

Figure 4:
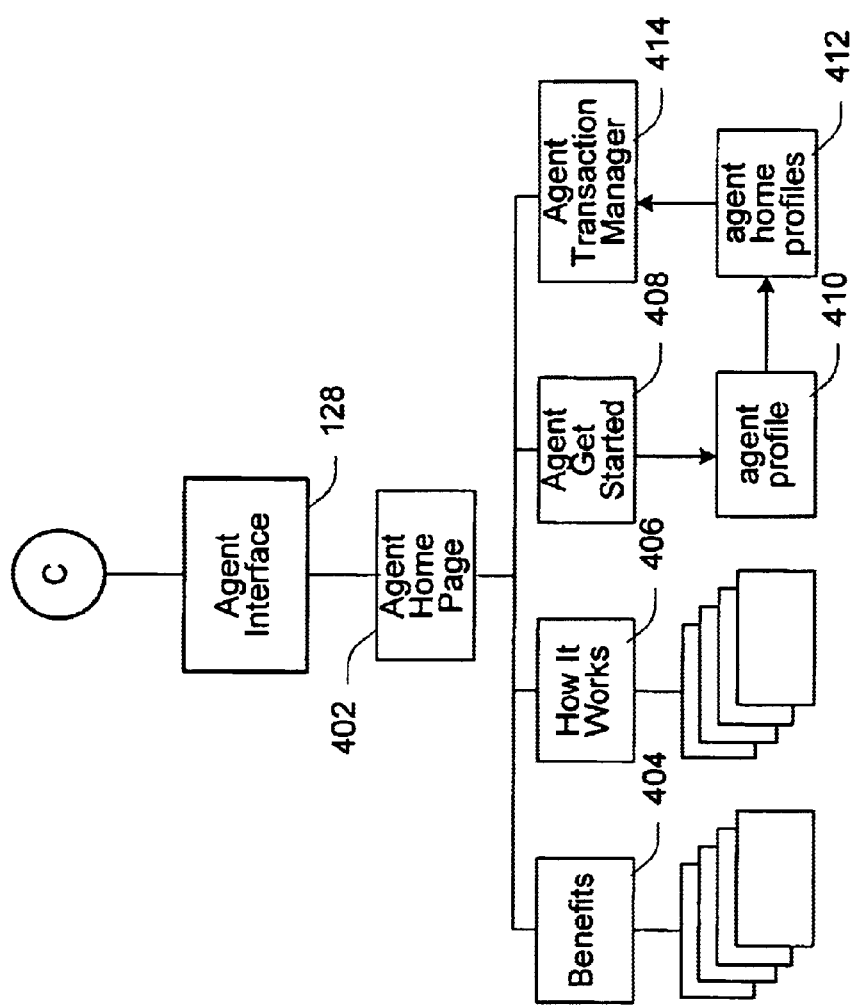
Figure 10:
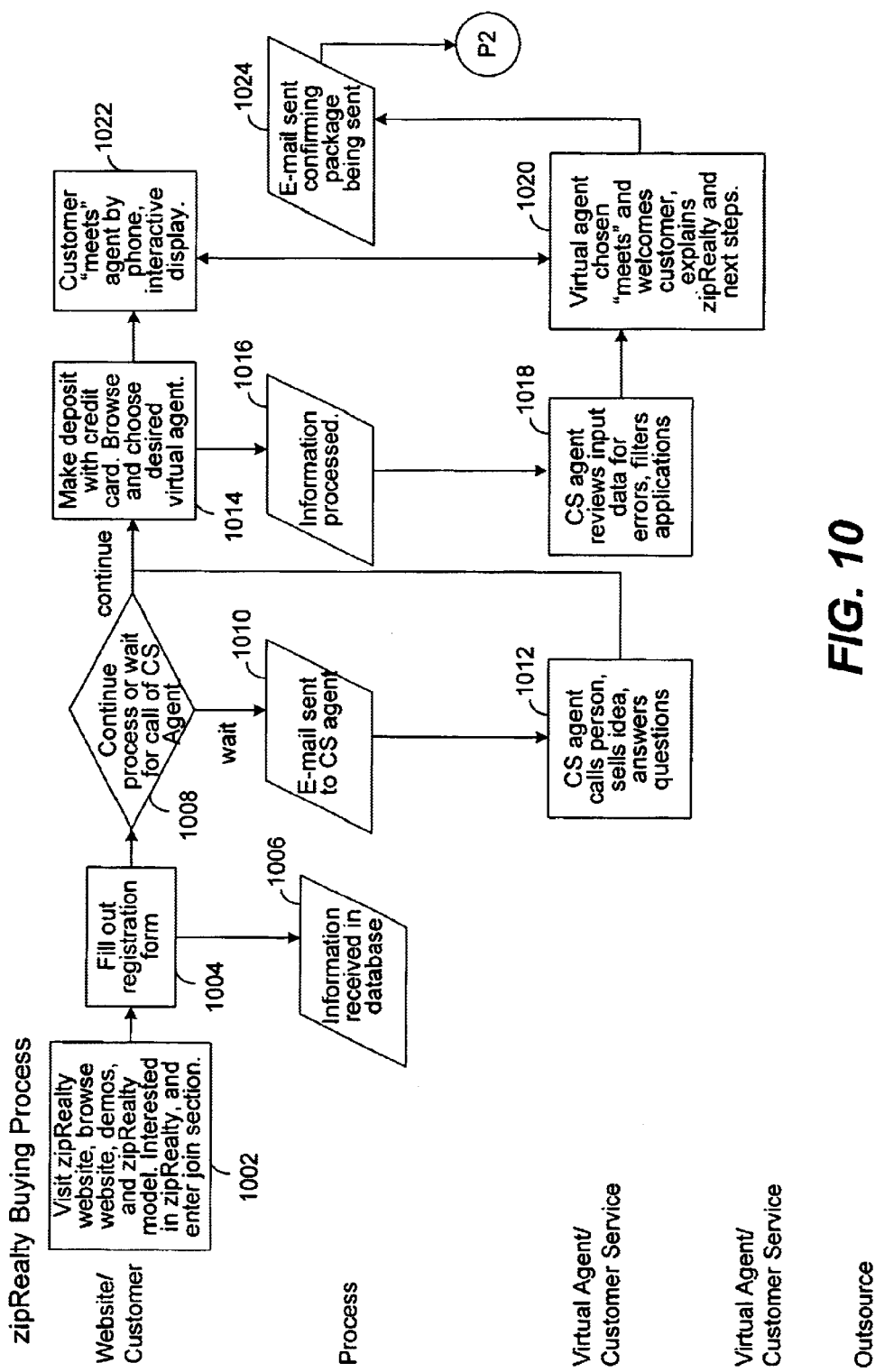

FIG. 4 shows a specific embodiment of agent interface 128. As mentioned above, this interface allows both agents associated with the web site and independent agents access to the system. By selecting this option in home page 100, an agent is provided access to an agent home page 402 from which she can access a variety of information regarding the benefits of the site (block 404), and the rules, procedures, and legal information related to the site (block 406). An agent may then choose to register with the site for the purpose of listing her properties or helping a client purchase a home by selecting the "Agent Get Started" text (block 408) in home page 402. The agent is then prompted to input a personal profile (block 410) and, if appropriate, profiles of any homes which the agent may wish to list with the site (block 412). Once the agent is registered with the site, she may access information and transact business using her own personalized transaction manager 414 in a manner analogous to that described above with reference to the buyer and seller processes.

A more detailed embodiment of buyer process 120 will now be described with reference to the process flow diagram of FIGS. 10–21. Initially and as described above, a potential buyer would visit the web site, browse through the various informational pages, possibly run the buyers demo, e.g., demo 106 of FIG. 1, and select the "Get Started Now!" text in any of several pages in the web site (block 1002). In response to this selection, the buyer is presented with and fills out a registration form which includes personal data such as, for example, name, residential address, e-mail address, etc (block 1004). This information is stored in a database associated with the site (block 1006) and, as will be described, will be available for further use in populating form associated with other stages of the real estate transaction.

The buyer may then decide to continue with the process or wait for a call from a customer service agent associated with the web site (block 1008). If the buyer elects to wait for the call, an e-mail message is sent to a customer service agent (block 1010) who then calls the buyer to answer any questions the buyer might have (block 1012). If the buyer decides to continue, she makes a deposit with, for example, a credit card, browses through the real estate professional bios, and selects a "virtual agent" (block 1014). This information is processed (block 1006), and reviewed and filtered by a customer service agent (block 1018), after which the buyer and the selected virtual agent connect by, for example, phone or an online audio or video conference (blocks 1020 and 1022) during which the buyer and the agent get to know each other and the agent describes the buying process including the next steps to be completed.

Figure 11:
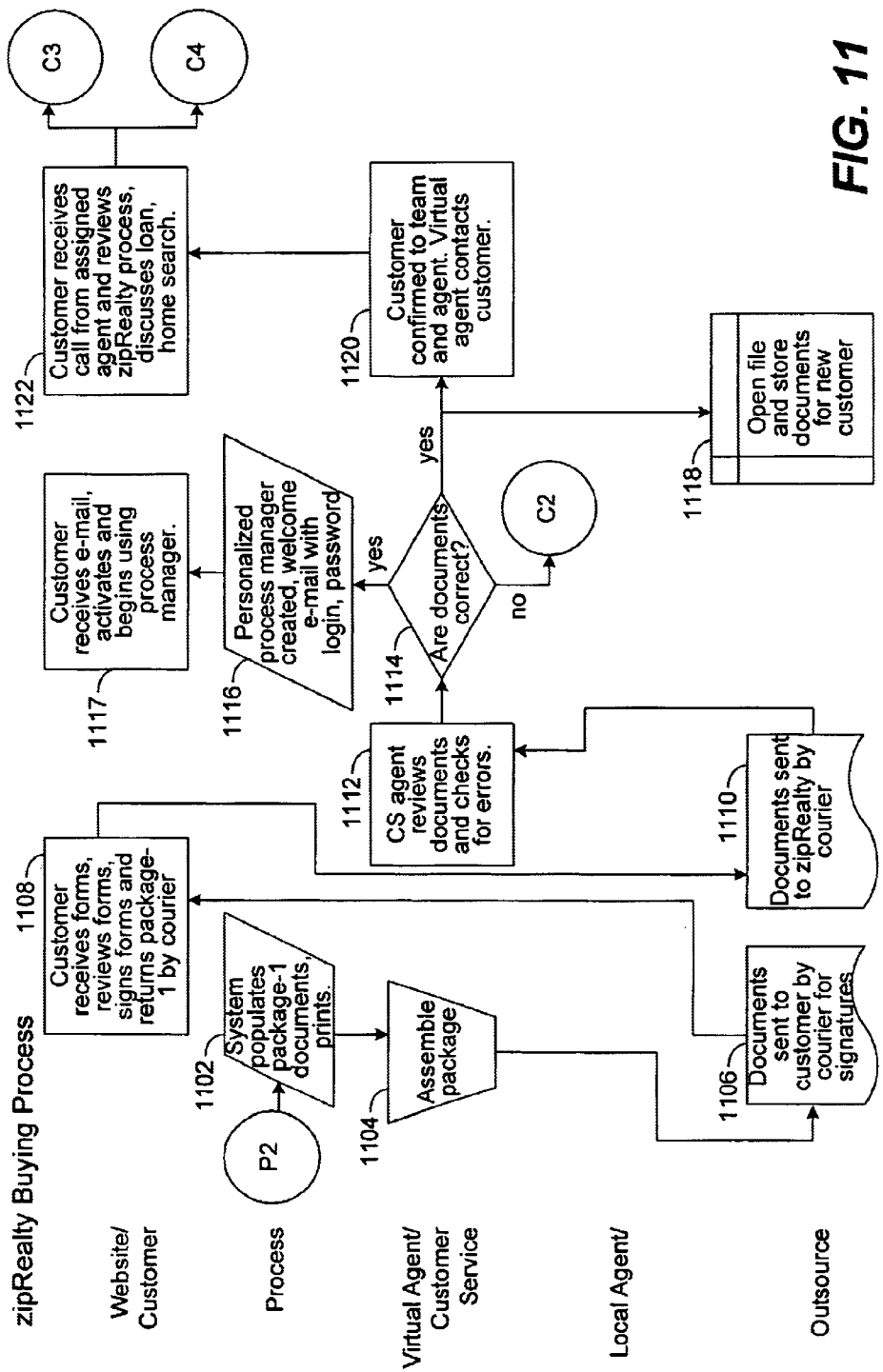

An e-mail is then sent alerting the buyer that a package of documents will be sent to the buyer's address (block 1024). According to a specific embodiment, the package includes a copy of the contract, an agency disclosure form, a property grading sheet, blank property grading forms, a disclosure form about the web site and rebates, and an overnight mail return envelope. Referring now to FIG. 11, documents are populated with the buyer's information in the site database and printed (block 1102). The documents are assembled by either the customer service agent or the virtual agent (block 1104) and sent via courier or some other delivery service to the buyer for execution (block 1106). When the buyer receives the documents, she reviews and signs them and then sends them back to the virtual agent by return courier or other delivery service (blocks 1108 and 1110) where they are reviewed and checked for errors (block 1112). If the documents are not correct (block 1114), they are either reprinted, reassembled, and sent back to the buyer for execution (block 1102 et seq.), or the buyer is asked to fill out the registration form again (block 1004 et seq.).

According to various embodiments, significant efficiencies are realized because of the manner in which forms for both buyers and sellers are populated using previously stored information. That is, by filling out a sufficiently detailed registration form at the beginning of the process, the user provides much of the information necessary for populating the forms necessary for bringing the process to fruition. As each stage having an associated form or set of forms arises, those documents are populated from the system database, the user only being queried for incremental pieces of information as appropriate. The savings in time and resources to both the user and the real estate professionals are both self evident and significant.

Referring back to block 1114, if the documents are in order, a number of things occur. A personalized process manager is created which will facilitate the home buying process for the buyer (block 1116). A screen shot illustrating the main interface to a specific embodiment of such a personalized process manager is shown in FIG. 22. An e-mail to the buyer is also generated welcoming her to the process and giving login instructions and a password for access to the site (blocks 1116). When the buyer receives the e-mail, she may activate log in using her password, and activate and begin using her process manager (block 1117). A physical file is also created for the physical documents (block 1118). In addition, the new customer, i.e., the buyer, is confirmed to the team of professionals associated with the web site at which point the selected virtual agent contacts the buyer (block 1120) to discuss the site's home buying process and any other questions the buyer might have regarding finding a home, securing financing, or any other aspects of the transaction. (block 1122).

Figure 12:
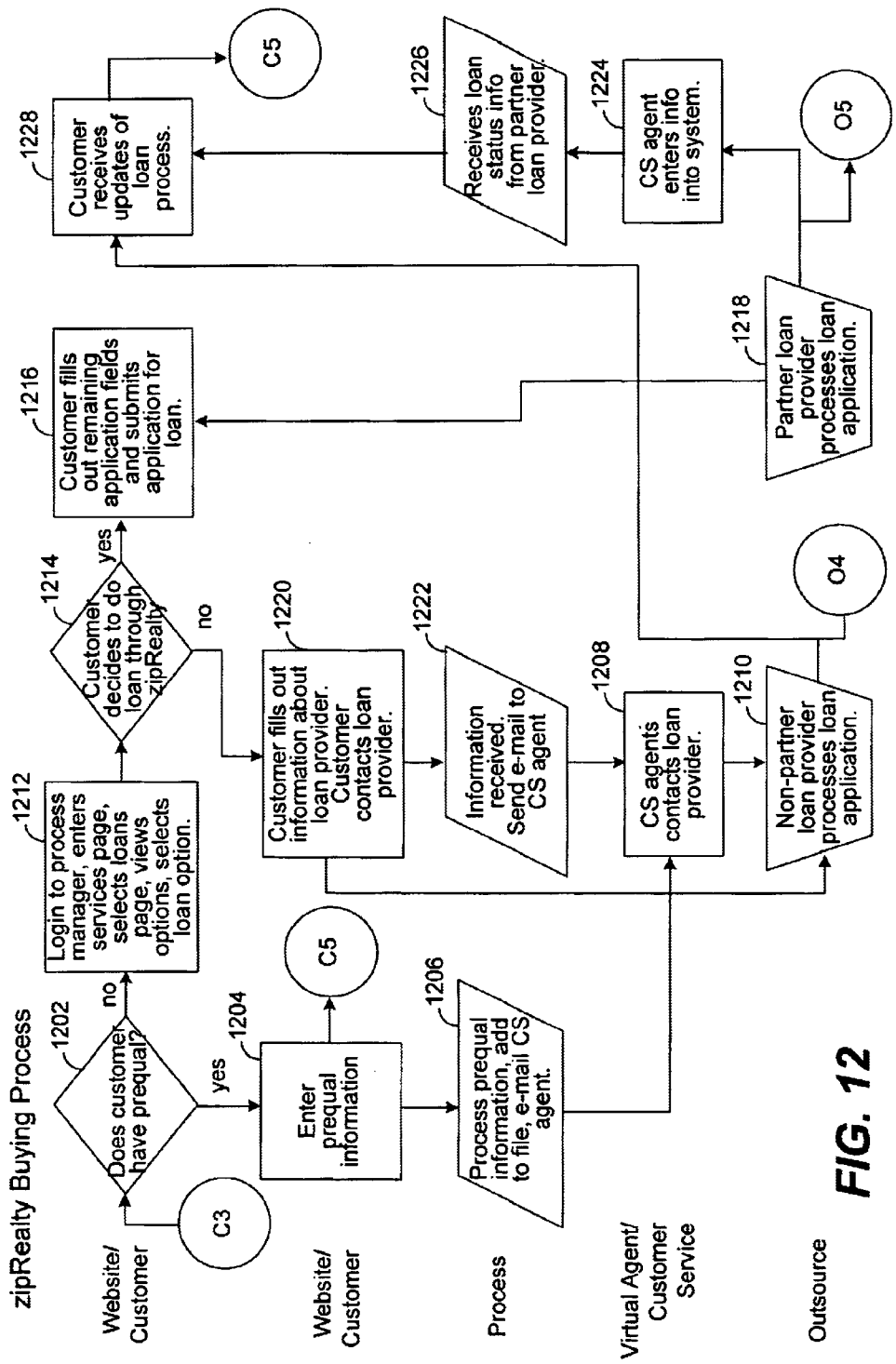

Referring now to FIG. 12, it is then determined whether the buyer has been prequalified for financing (block 1202). If the buyer is prequalified, the buyer enters her prequalification information which is incorporated into the system database (block 1204). The prequalification information is processed and added to the buyer's file and an e-mail is generated to a customer service agent (block 1206) in response to which the customer service agent contacts the loan provider identified in the prequalification information to verify the information (block 1208). The loan provider then processes the buyer's loan application (block 1210).

If the buyer is determined at block 1202 not to be prequalified, she is instructed to log into her personalized process manager, access the appropriate service page (i.e., the loan service page), review the available loan options, and select a loan option (block 1212). If the buyer selects a loan option which is administered through the web site (block 1214), she is prompted to fill out any remaining information for submission of the loan application (block 1216) whereupon the loan application is processed by the selected loan provider who is also a partner with the web site (block 1218).

If the buyer selects a loan option with a provider who is not a partner of the web site (block 1214), the buyer must input information about the loan provider and contact the loan provider herself (block 1220). Once loan provider information is received from the buyer, an e-mail is generated and transmitted to a customer service agent at the web site (block 1222) in response to which the customer service agent contacts the loan provider to verify the information (block 1208). The buyer then follows up separately with the loan provider and fills out a loan application which is then processed by the loan provider (block 1210).

In the case of the loan provider who is partnered with the web site, a customer service agent enters the loan information into the system (block 1224), receives periodic status information regarding the loan from the loan provider (block 1226) and provides updates to the buyer about the loan process (1228). According to a specific embodiment of the invention, loan updates are provided to the buyer for both partner and non-partner loan providers.

Figure 13:
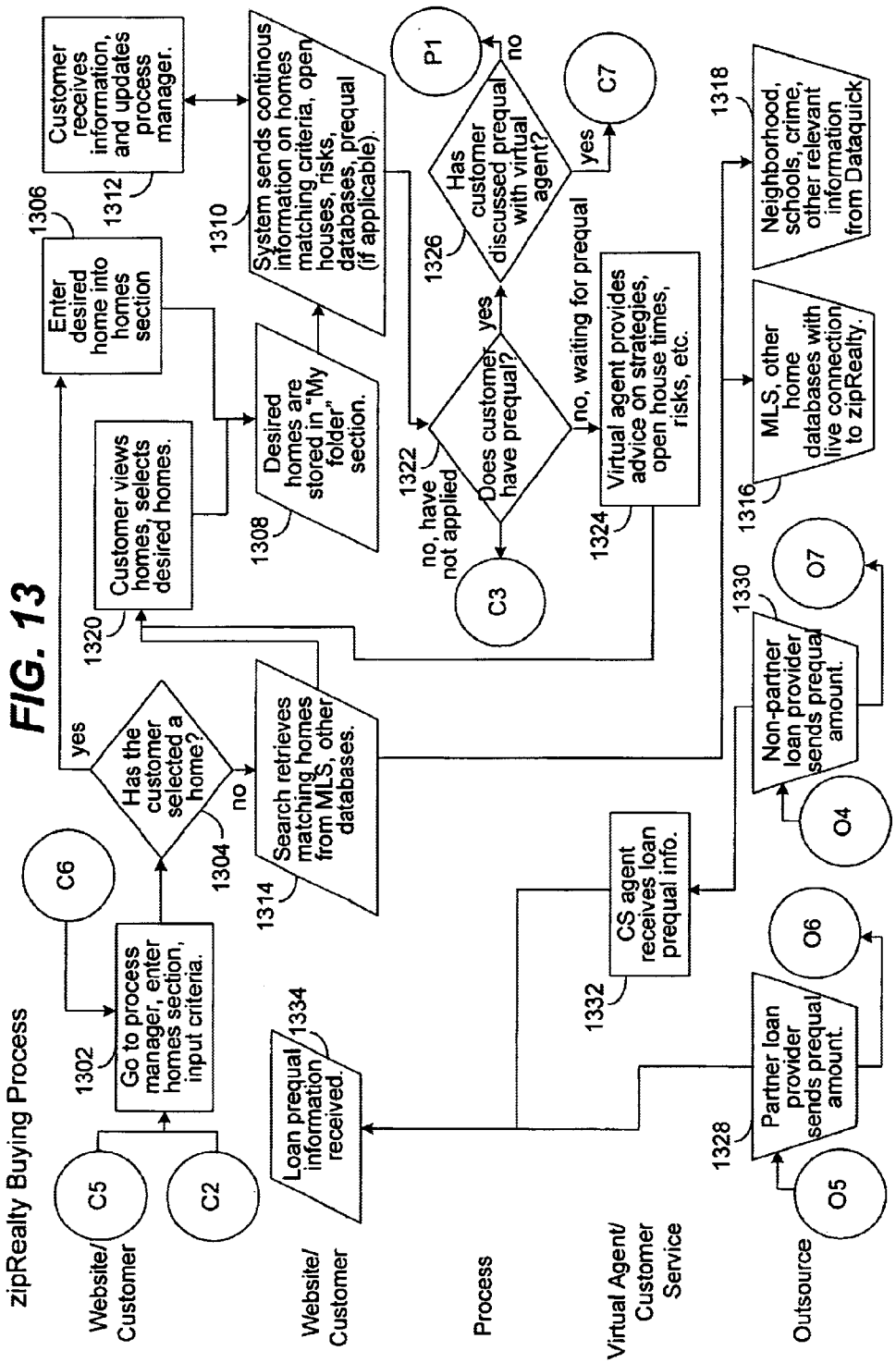
Figure 14:
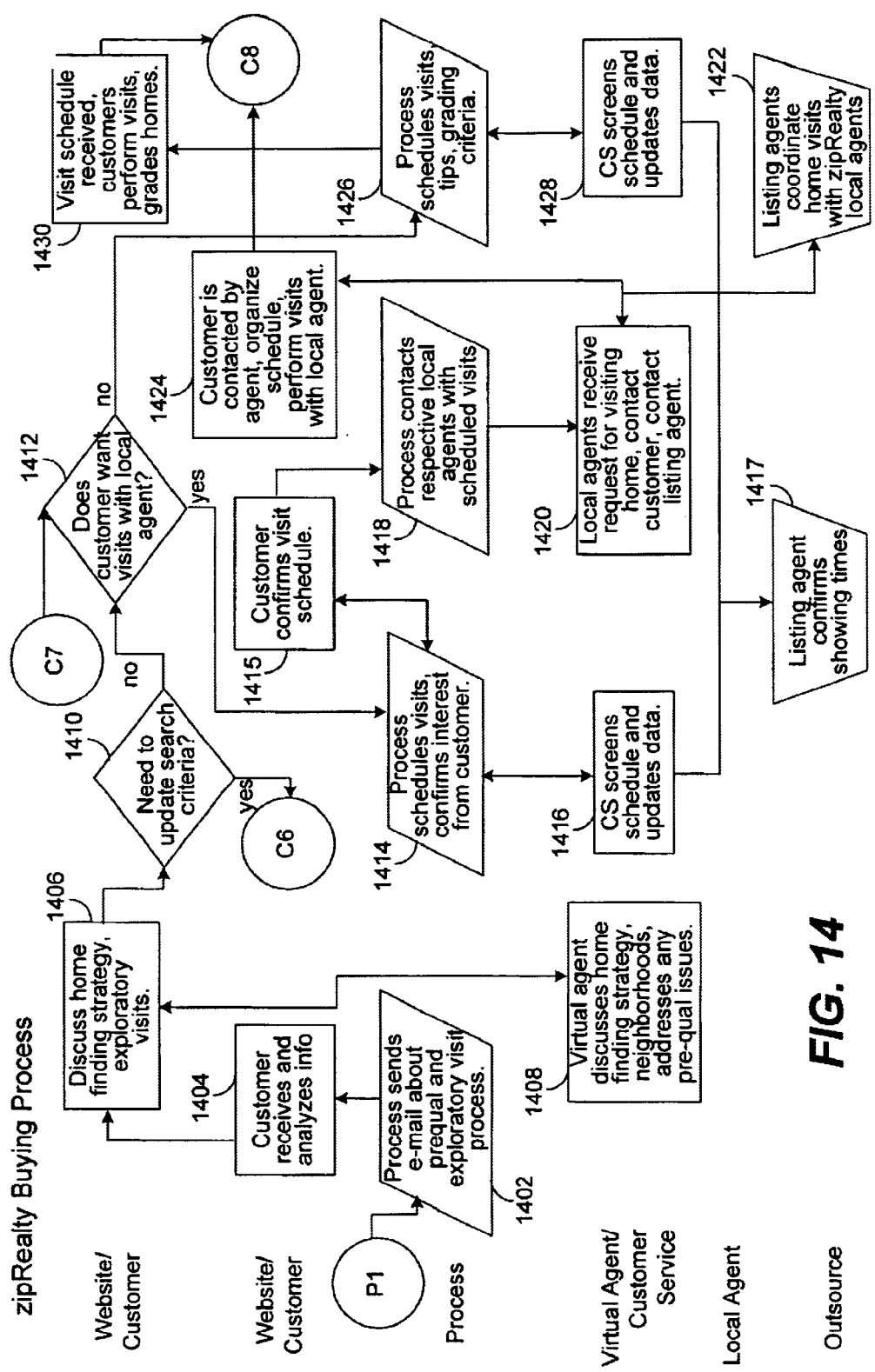

Referring now to FIG. 13, with prequalification out of the way and while the loan is being processed, the buyer may access the homes section of her personalized transaction manager, enter her criteria for selecting a home, and search for potential candidates (block 1302). If the customer has selected a home (block 1304), the home information is entered into the homes section of the transaction manager (block 1306) as well as into the buyer's "My Folder" section (block 1308). The "My Folder" section contains a comprehensive record of the various aspects of the transactions so that the buyer may review any of the information at her leisure. In addition, once the buyer enters her criteria, the system begins to continuously send information to the buyer regarding homes which meet her criteria (block 1310) including, for example, open houses. The buyer receives this information and updates her process manager where the information proves useful (block 1312).

If the buyer has not selected a home (block 1304) but is instead initiating a search, the search retrieves homes any of a variety of databases which include home listings (block 1314) such as, for example, Multiple Listing Service (MLS) and other database services (e.g., realtor.com, homeseekers.com, and homeadviser.com) which have live connections to the web site (block 1316). Also available to the buyer is information regarding the neighborhoods in which any home candidates are located (block 1318) including, for example, information relating to schools, crime rates, and other demographic information. The buyer reviews the search information and selects one or more candidates (block 1320) which are then entered into the buyer's "My Folder" section as previously discussed (block 1308).

If in the course of sending the buyer information at block 1310 it is determined that the buyer has not applied for prequalification (block 1322), the process proceeds to block 1212 of FIG. 12 to begin the prequalification process. If it is determined that the buyer is waiting on the prequalification (block 1322) the virtual agent may still provide advice on a variety of topics (block 1324) including, for example, home searching and buying strategies, open houses, the risks inherent in the real estate market, etc. The customer may then continue to review home search results, select candidates, and store information in the "My Folder" section of their personalized transaction manager (blocks 1320 and 1308).

If it is determined that the buyer is prequalified for financing (block 1322), it is then determined whether the buyer and the virtual agent have yet discussed the buyer's prequalification. If not, and referring now to FIG. 14, the system generates and sends an e-mail to the buyer containing general information regarding prequalification as well as a description of the exploratory visit process (block 1402) which includes, for example, a description of open houses as well as other types of visits to the property. The buyer receives and reviews the information in the e-mail (block 1404) and discusses the e-mail and any related topics with the virtual agent (blocks 1406 and 1408) including, for example, home finding strategies, exploratory visits, and any outstanding prequalification issues. During the course of these discussions, it may become apparent to the buyer that the search criteria she has been using requires updating (block 1410). If so, the process may revert to block 1302 in which the buyer may input new criteria.

The buyer is then presented with the option of doing the exploratory visits with a local agent familiar with the housing market in the region and neighborhood of interest (block 1412). The buyer is also presented with this option if, at block 1326, she and the virtual agent have already discussed prequalification. If the buyer chooses to work with such a local agent, the system schedules the visits and confirms the buyer's interest in the both the visits and the schedule (blocks 1414 and 1415) while a customer service representative screens the schedule, updates appropriate data, and confirms the showing times with the listing agent associated with the selected home (blocks 1416 and 1417). The system also contacts the appropriate local agent(s) affiliated with the web site alerting her to the scheduled visits (block 1418). When the local agent receives notification of the scheduled visit(s), she contacts both the buyer and the listing agent (block 1420), coordinates the visit(s) with the listing agent (block 1422), and coordinates and attends the visit(s) with the buyer (block 1424).

If the buyer does not want to work with a local agent, i.e., she wants to make the exploratory visit(s) alone, the system again schedules the visit(s), and, because no local agent will be present, the system also provides information relating to evaluating the suitability of a property, i.e., tips, grading criteria, etc. (block 1426). A customer service representative associated with the web site screens the schedule, updates appropriate data, and confirms the showing times with the listing agent associated with the selected home(s) (blocks 1428 and 1417). The buyer then receives the visit schedule, and visits and evaluates the property or properties (block 1430).

Figure 15:
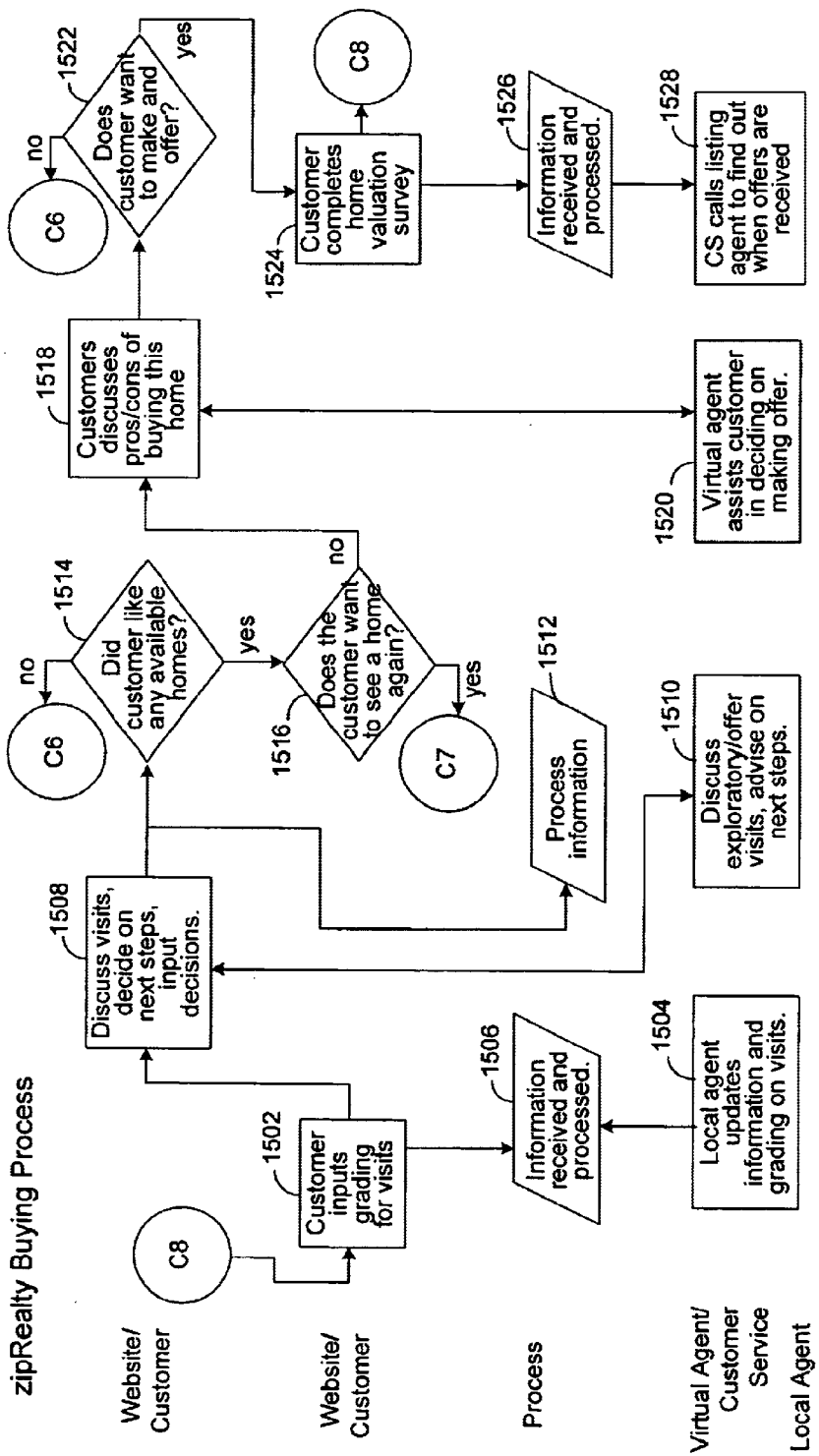

Referring now to FIG. 15, once the buyer has visited and evaluated a property, she enters her evaluation into one of the interfaces of her process manager using, for example, the site's grading criteria (block 1502). If a local agent was involved with the visit, she also enters her evaluation of the property (block 1504). All of this information is received and processed by the system (block 1506). The buyer then discusses the visits and other matters with the virtual agent (block 1508 and 1510) including, for example, whether any properties were acceptable and the strategic planning of the next steps in the transaction. Any decisions made by the buyer at this stage, e.g., to pursue a particular property, are processed and stored in the system (block 1512).

If the buyer does not find any homes acceptable (block 1514), the process returns to block 1302 (FIG. 13) to search for additional prospects. If, however, the buyer found one or more of the homes acceptable (block 1514) and would like to see one or more of those homes again (block 1516), the process returns to block 1412 (FIG. 14) for scheduling of additional visits. If the buyer does not need to view a property again, she and the virtual agent discuss merits of the particular property and decide whether an offer on the property should be prepared (blocks 1518 and 1520).

If the buyer decides she does not want to make an offer (block 1522), the process returns to block 1302 (FIG. 13) to search for additional prospects. If, however, the buyer decides to make an offer on a particular property, she is prompted by the system to complete a home valuation survey (block 1524) the information from which is processed by the system (block 1526) and in response to which a customer service agent calls the listing agent of the property to determine when offers are being received by the sellers (block 1528).

Figure 16:
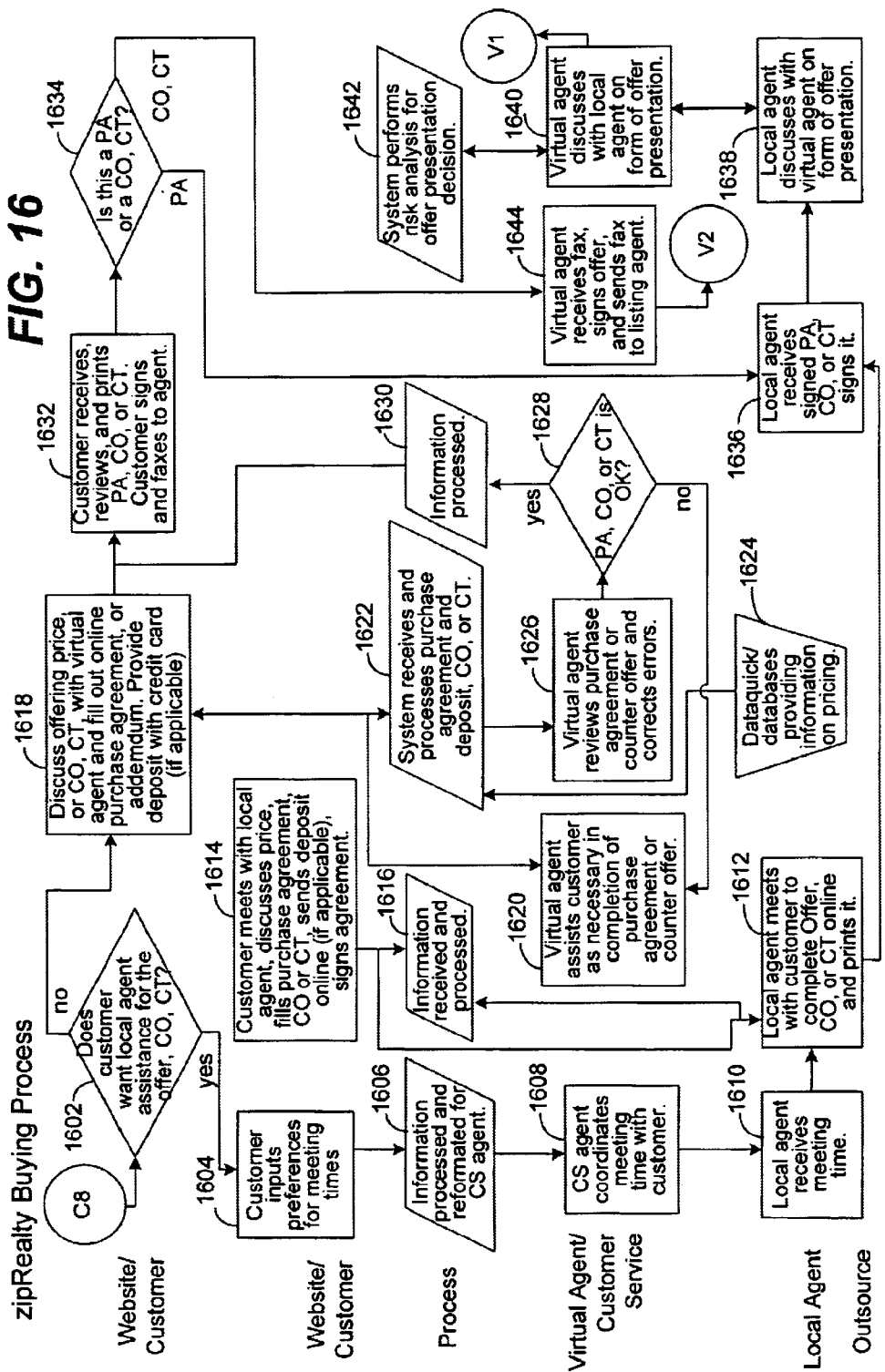

Referring now to FIG. 16, the buyer is asked whether she would like the assistance of a local agent in the market of interest in writing up the offer, contingency offer, or counteroffer depending upon the stage of the transaction (block 1602). If the buyer chooses to work with a local agent, she indicates preferences for meeting times via her personalized process manager (block 1604) which information is then processed by the system and communicated to a customer service agent (block 1606) for coordination of a meeting time with the buyer (block 1608) which is then communicated to the local agent (block 1610). The buyer then meets with the local agent at the buyer's convenience to discuss the price and content of the offer, and fill out, execute and print the offer, and provide any necessary deposits (blocks 1612 and 1614). The information in the executed offer is received, processed, and stored by the system (block 1616).

If the buyer elects not to avail herself of the assistance of a local agent (block 1602), she may prepare the offer herself with the help of the virtual agent. That is, the buyer and the virtual agent discuss an offer price, any contingencies to be built into the offer, fill out the offer (or addendum to an offer), and make provisions for any deposits (blocks 1618 and 1620). The information in the offer is received and processed by the system (block 1622) using information from one or more databases which provide pricing information such as, for example, Property Data from First American Tide of Santa Ana, Calif. (block 1624). The virtual agent then reviews the completed offer, makes any necessary corrections (block 1626), and once the document is completely correct (block 1628), causes the system to process and store the completed document (block 1630). The buyer then receives the completed document for review, prints it, signs it and faxes it to the virtual agent (block 1632). If the completed document is a purchase agreement (block 1634), the document is sent to a local agent in the market of interest for execution (block 1636). Of course, if at block 1602, the buyer has elected to use a local agent for generating the offer, the process moves to block 1636 from block 1612.

If the completed document is a counter offer or contingency offer (block 1634), the virtual agent receives the faxed document, signs it, and faxes it to the listing agent (block 1644). The local agent and the virtual agent then coordinate presentation of the offer (blocks 1638 and 1640) and the system performs risk analysis regarding the offer presentation decision (block 1642).

According to a specific embodiment of the invention, the offer or bid submitted by a prospective buyer may be generated using a proprietary online form entitled "Notification of Intent to Purchase Real Property" which may go a long way toward streamlining the negotiation process. An example of this form is shown in FIG. 16*a*. With this form, the seller may specify a number of "Requirements for Sale" to which a prospective buyer must agree before a bid must be submitted and considered. For example, and as shown, the seller may specify that the property is being sold "as is," or that a pest report will be cleared by the seller prior to closing and perhaps that the amount of the pest report will be credited to the buyer as well. The seller may also specify a number of other requirements including, but not limited to, a maximum escrow period, an apportionment of tax liability, amounts to be credited to the buyer for closing costs or repair work, rent back provisions, personal property to be included in the sale, or whether the seller is willing to accept the sale of the buyer's property as a contingency in this transaction. The seller may also specify a minimum bid price. The ability to specify these requirements up front goes a long way toward minimizing the post acceptance haggling that characterizes many real estate transactions. That is, the seller does not usually get the opportunity to propose such requirements until after the process has started. This often results in a series of aborted transactions in which the buyer and seller find out after considerable work has been done that their requirements and expectations are not sufficiently aligned. The requirements essentially act like a filter to ensure that only serious buyers whose intentions are aligned with the seller's submit bids. Thus, when the contract is written by the buyer, the major terms, if not all of the terms, of the contract have been already accounted for in the bid that has been accepted by the seller. This new bidding process significantly reduces the negotiation time in the real estate transaction process. Once the bid is accepted, the buyer can complete the rest of the contract process online by completing the online forms.

Additionally, current online bidding processes operate where the actual bidding takes place at or near the end of the process. That is, there is no incentive for a buyer to place a bid during the early part of the bidding period. According to the present invention, an incentive is provided for buyers to bid before the end of the process, and an incentive is created for either the auction type of scenario to occur when the first bid is submitted or for the seller to accept the bid before the end of a bidding period. This can reduce the home selling process by several days over any other type of model that is currently existing today.

According to a specific embodiment of the invention, the auction atmosphere may be created before the end of the bidding process because the seller has the ability to accept a bid at any time during the bidding period and buyers are encouraged to place "preemptive" bids early in the process. Consequently, the auction atmosphere may be created much earlier than the other models currently being used by typical auction sites. It should be noted and will be understood that the bidding process of the present invention may be applied to a wide variety of other products and services being auctioned in other industries.

Figure 17:
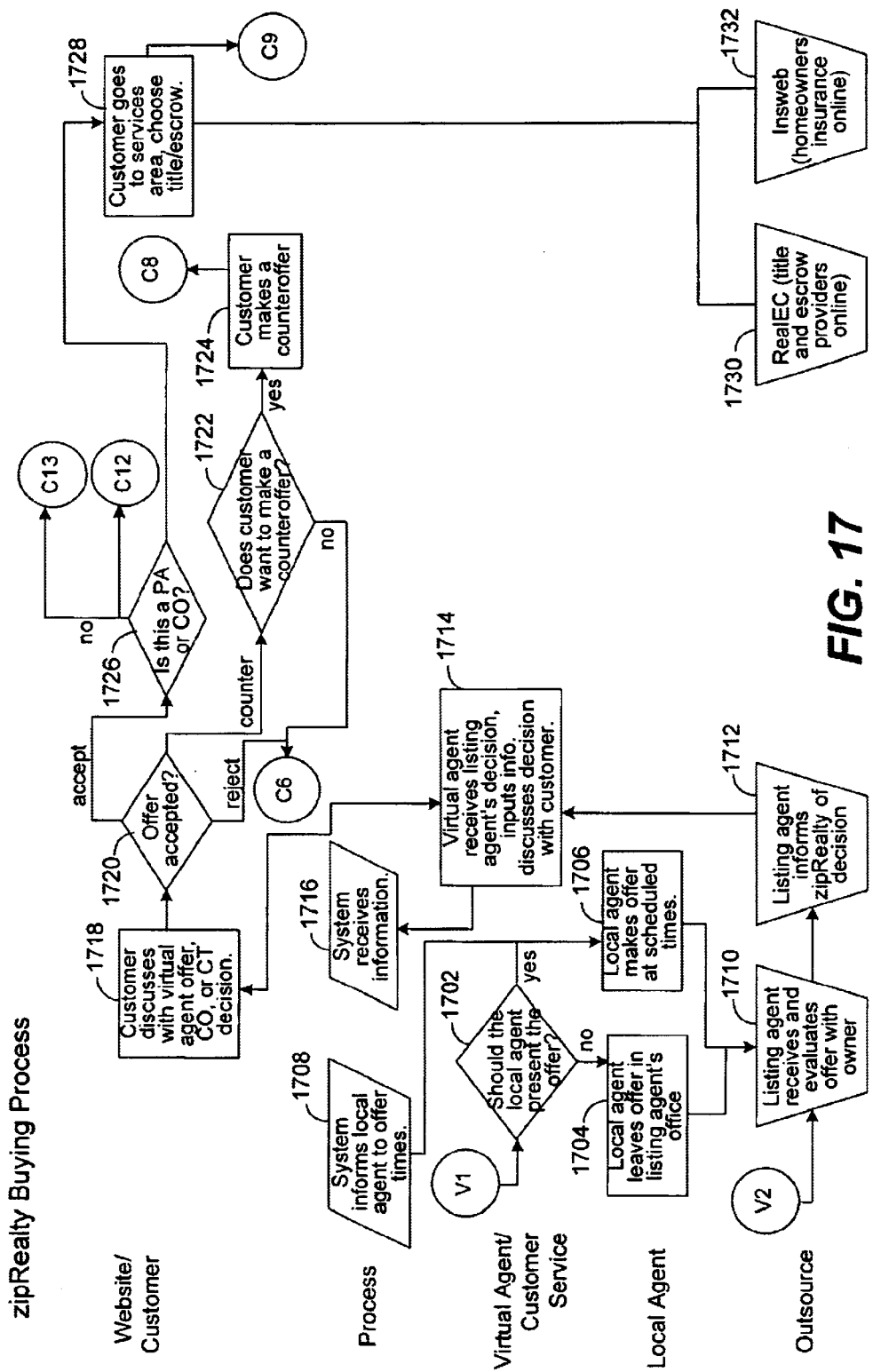

Referring now to FIG. 17, for a purchase agreement, the local and virtual agents decide whether the local agent should formally present the offer (block 1702). If not, the local agent simply delivers the offer to the listing agent's office (block 1704). If so, however, the local agent presents the offer at a time scheduled for presentation of offers (block 1706), the schedule for which is provided to the local agent by the system (block 1708). For a counter or contingency offer, the document may be faxed to the listing agent as discussed above with reference to block 1644. After the offer is delivered, it is received and evaluated by the listing agent (block 1710) who then informs the local agent of the seller's decision (block 1712).

Upon receiving the decision information from the listing agent, the virtual agent inputs the information into the system and discusses the decision with the buyer (blocks 1714–1718). If the decision is a rejection of the offer (block 1720), the buyer may begin the home selection process anew (block 1302 of FIG. 13). If the decision is a counter offer (block 1720) and the buyer does not want to make a counter offer (block 1722), the buyer may begin the home selection process anew (at block 1302). If, on the other hand, the buyer wishes to make a counter offer (block 1722), the counter offer is generated (block 1724) and the process returns to block 1602 of FIG. 16 in which the buyer may request the assistance of a local agent for generation of the counter offer.

Figure 20:
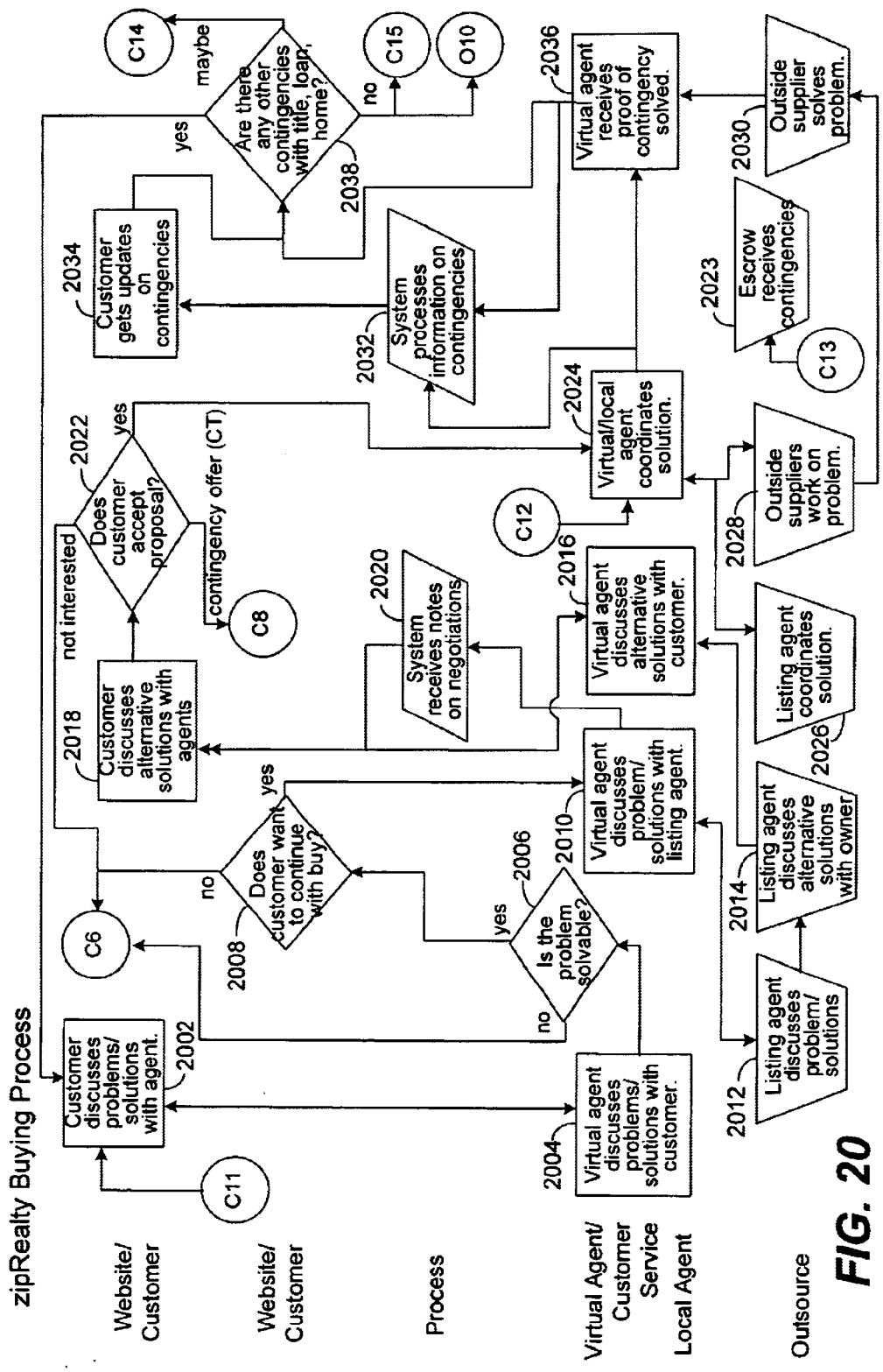

If the decision is an acceptance of the offer (block 1720) and the offer is not a contingency offer (block 1726), the buyer then accesses the services area of the system web site (block 1728) to choose providers for title and escrow services and homeowners insurance from a variety of affiliated service providers (blocks 1730 and 1732). If the offer is a contingency offer, the contingencies are received in escrow as shown in FIG. 20.

Figure 18:
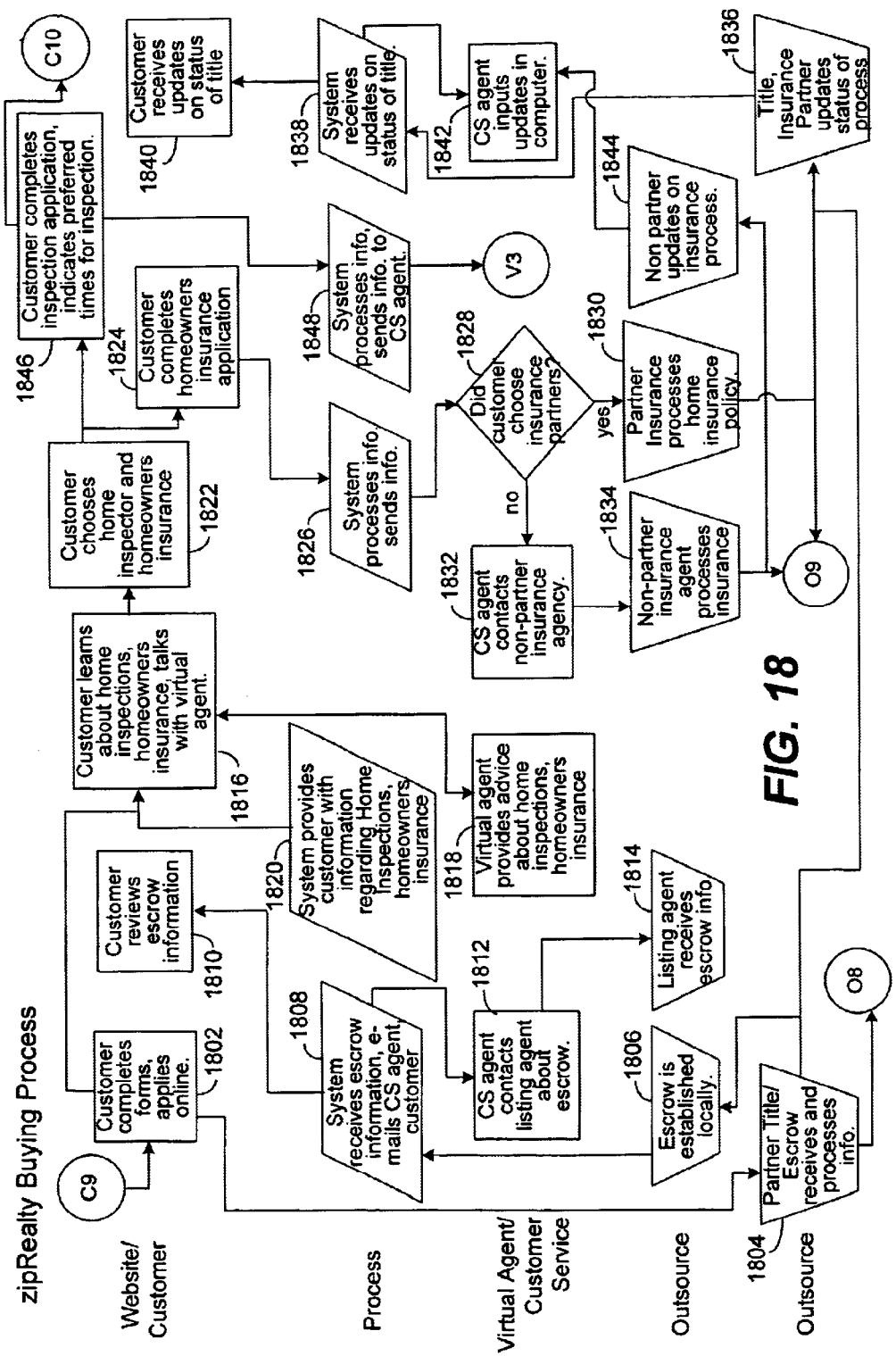

Referring now to FIG. 18, once the buyer selects title and escrow service providers (blocks 1728–1732), the buyer applies for those services online (block 1802) and the affiliated service providers receive and process the applications (block 1804). An escrow is established in the geographic vicinity of the subject property (block 1806), the escrow information is received, processed and stored by the web site, and notifying e-mails are generated to both the appropriate customer service agent associated with the web site as well as the buyer (block 1808), after which the buyer may review the escrow information (block 1810). The web site customer service agent also contacts the listing agent and transmits the escrow information to the listing agent (blocks 1812 and 1814).

In addition to completion of the online application forms (block 1802), the buyer is given access to informational material regarding homeowners insurance and home inspections as well as an opportunity to discuss the same with the virtual agent (blocks 1816–1820). Once the buyer selects a homeowners insurance provider (block 1822) she completes an application for homeowners insurance online (block 1824) which is then processed by the web site system (block 1826). According to a specific embodiment, completion of the application is facilitated by populating the application with previously stored information about the buyer. If the buyer selected an insurance provider which is a partner with the web site (block 1828), the selected partner processes the application and the homeowners insurance policy (block 1830). If the buyer selected an insurance provider which is not a partner of the web site (block 1828), a customer service agent contacts the non-partner underwriter (block 1832) who processes the application and policy (block 1834).

Where the insurance underwriter is a partner of the web site, it provides status to the web site regarding the process (block 1836) which are received by the system (block 1838) and made available to the buyer (block 1840) and a customer service agent for updating any relevant information (block 1842). Where the insurance underwriter is not a partner of the web site, the underwriter sends updates to the customer service agent for manual updating relevant information (blocks 1844 and 1842).

Upon choosing a home inspector (block 1822), the buyer fills out an inspection application indicating preferred times for conducting the inspection (block 1846), the application information being received, processed, and sent to a customer service agent by the system (block 1848).

Figure 19:
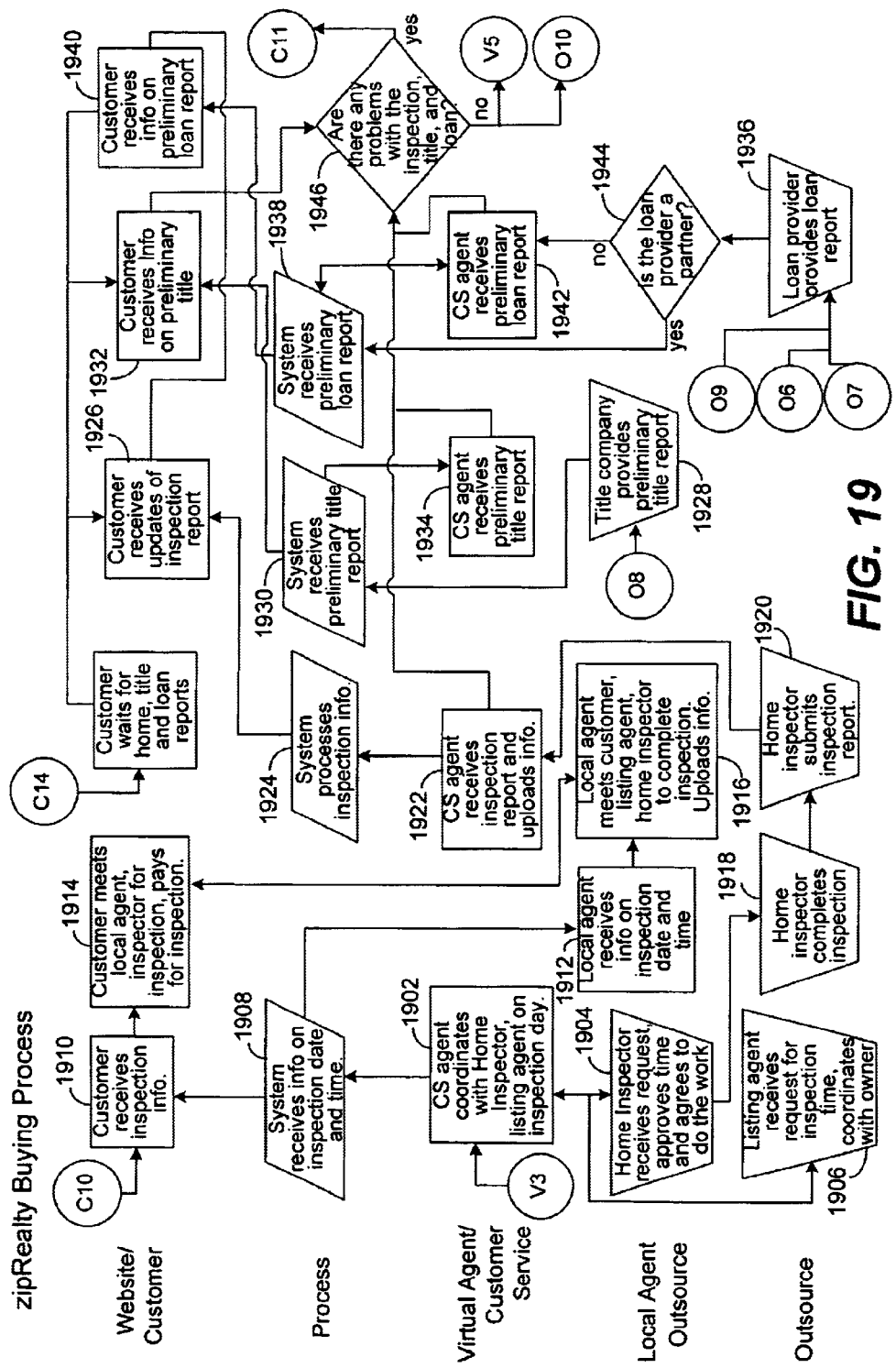

Referring now to FIG. 19, the customer service agent coordinates the scheduling of the inspection with the home inspector, the listing agent, and the seller (through the listing agent) (blocks 1902–1906). Once scheduled, information regarding the inspection is received by the system (block 1908) and transmitted to the buyer (block 1910) and the local agent associated with the web site (block 1912). The buyer and local agent then meet with the inspector and the listing agent for conduction of the inspection, after completion of which the inspector submits the inspection report (blocks 1914–1920). A customer service agent associated with the web site receives the inspection report and enters the relevant information into the system (block 1922) which receives and processes the inspection data (block 1924) any updates of which are made available to the buyer (block 1926).

The partner title company enlisted at block 1804 (FIG. 18) provides a preliminary title report (block 1928) which is received by the system (block 1930) and made available to the buyer (block 1932) and the customer service agent (block 1934). The loan provider enlisted in blocks 1210 and 1218 of FIG. 12 and from which prequalification information was previously received and stored (blocks 1328–1334) provides a loan report (block 1936) which is received by the system (block 1938) and made available to the buyer (block 1940) and the customer service agent (block 1942), the order in which the system and the customer service agent receive the loan report being dependent upon whether the loan provider is a partner of the web site (block 1944).

Referring now to FIG. 20, if there are any problems with the inspection, title, or loan (block 1946 of FIG. 19), the buyer discusses any such problems and appropriate solutions with the virtual agent (blocks 2002 and 2004). If the problems are insoluble (block 2006), the buyer may begin the home selection process anew (block 1302 of FIG. 13). If, on the other hand, the problems are soluble and the buyer wants to continue with the transaction (block 2008), the virtual agent and the listing agent discuss the problems and possible solutions with each other (blocks 2010 and 2012) as well as their respective clients (blocks 2014–2018). The system receives and stores data regarding these negotiations (block 2020).

If the buyer is not interested in any of the proposed solutions (block 2022) she may begin the home selection process again at block 1302. Alternatively, the buyer may put together a contingency offer as discussed above with reference to FIG. 16 in which case, the contingencies are received in the previously created escrow (block 2023). If, however, the buyer finds a proposed solution acceptable (block 2022), the virtual or local agent coordinates the solution, i.e., the clearing of any contingencies, with the listing agent and/or any outside parties as necessary (blocks 2024–2030). Throughout this process, the system is receiving and processing data relating to the contingencies to be solved (block 2032) and updating the buyer (block 2034).

When either the virtual agent receives proof that the problems have been solved, i.e., the contingencies have been met, (block 2036), and there are no additional contingencies (block 2038), or there were no problems with the inspection, title, or loan (block 1946 of FIG. 19), the buyer and the virtual agent discuss the process of closing escrow (blocks 2102 and 2104). Upon receiving the buyer's agreement (block 2106), the virtual agent coordinates closing of the escrow with the escrow service (blocks 2108 and 2110). Data regarding the closing are received and processed by the system (block 2112). As there were no additional contingencies to be dealt with, the title report and the loan money are deposited in escrow (blocks 2114 and 2116). To effect the closing, the escrow officer sets up meetings with both the buyer and the seller for execution of documents, exchange of money, and transfer of the property (blocks 2118 and 2120).

Once the buyer becomes the owner of the property, the web site maintains an owner file on the buyer which includes selected portions of the information input throughout the course of the transaction (blocks 2122 and 2124). The new owner also receives access to a home manager service which is coordinated by the web site and which allows the new owner to store records of the sales transaction, store maintenance records, select repair contractors, and keep track of other important data such as maintenance schedules and equipment replacement schedules (blocks 2126 and 2128). And, because of the close connection maintained between the web site and the property owner of the years, it is quite simple to initiate the sell process via the web site when the owner is ready to sell the property (block 2130).

A computer network is a geographically distributed collection of interconnected communication links for transporting data between nodes, such as computers. By definition, a network is a group of computers and associated devices that are connected by communications facilities or links. Network connections can be of a permanent nature, such as via cables, or can be of a temporary nature, such as connections made through telephone or other communication links. A plurality of computer networks may be further interconnected by intermediate nodes, or routers, to extend the effective "size" of the networks, smaller portions of which may be maintained as autonomous domains of nodes. A router is computer system that stores and forwards data packets from one local area network (LAN) or wide area network (WAN) to another. Routers see the network as network addresses and all the possible paths between them. They read the network address in a transmitted message and can make a decision on how to send it based on the most expedient route (traffic load, line costs, speed, bad lines, etc.). Routers typically communicate by exchanging discrete "packets" of data according to predefined protocols. In this context, a protocol comprises a set of rules defining how the nodes interact with each other.

Networks vary in size, from a local area network (LAN) consisting of a few computers and related devices, to a wide area network (WAN) which interconnects computers and LANs that are geographically dispersed. An internetwork, in turn, is the joining of multiple computer networks, both similar and dissimilar, by means of gateways or routers that facilitate data transfer and conversion from various networks. A well known abbreviation for internetwork is internet. As currently understood, the capitalized term Internet refers to the collection of networks and gateways that uses a Transmission Control Protocol/Internet Protocol (TCP/IP). The Internet has recently seen explosive growth by virtue of its ability to link computers located throughout the world.

Figure 23:
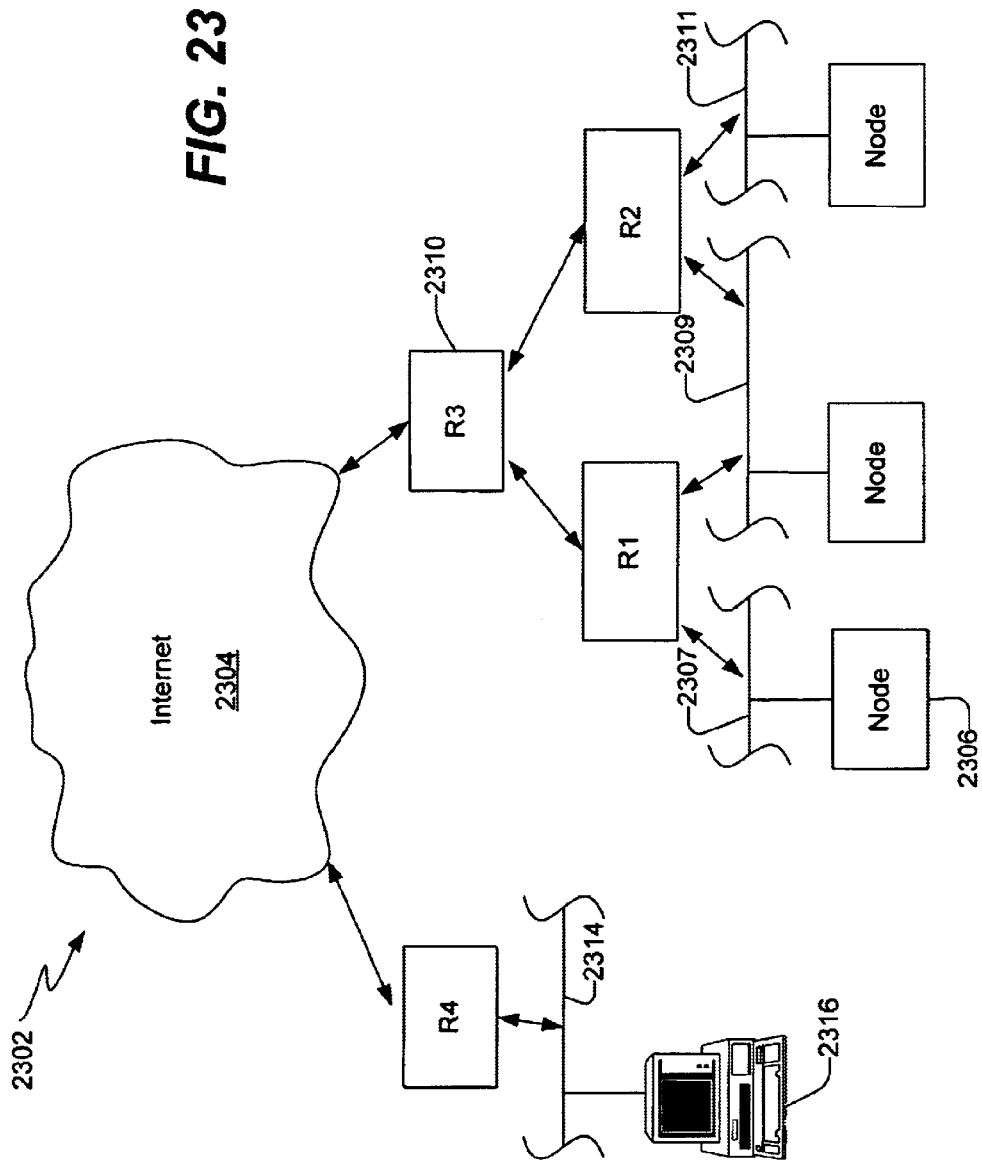
FIG. 23 shows a diagram of an IP network, which is an example of one type of flow-based network in which the technique of the present invention may be implemented.

FIG. 23 shows a diagram of an IP network, which is an example of one type of flow-based network in which the technique of the present invention may be implemented. A flow can be a hard-state virtual circuit in an ATM network, a soft-state flow in an IP network (e.g., a MPLS tunnel), or a stateless connection as a TCP/IP connection in today's Internet. As shown in FIG. 23, the IP network 2302 includes the Internet (or a WAN) 2304 over which a Node 2316 (e.g. a computer) can communicate with a separate node 2306 via a plurality of intermediate nodes (e.g. R1, R3, R4). Node 2306 may be, for example, a server which is part of Local Area Network (LAN) 2307, connected to the Internet via routers R1 and R3. Router R3 (2310) may, in turn, connect one or more other routers (e.g., router R2) with the Internet.

A LAN is a communication network that serves users within a confined geographical area. It is made up of servers, workstations, a network operating system and a communications link. Servers are high-speed machines that hold programs and data shared by all network users. The workstations, or clients, are the users' personal computers, which perform stand-alone processing and access the network servers as required The controlling software in a LAN is the network operating system, such as, for example, NetWare, UNIX, and/or Appletalk, which resides in the server. Message transfer is managed by a transport protocol such as, for example, IPX, SPX, SNA and/or TCP/IP. The physical transmission of data is performed by the access method (Ethernet, Token Ring, etc.) which is implemented in the network adapters that plug into the machines. The actual communications path is the cable (twisted pair, coax, optical fiber) that interconnects each network adapter.

In order to reduce design complexity, most networks are organized as a series of hardware and software levels or "layers" within each node. These layers interact to format data for transfer between, e.g., a source node and a destination node communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services. The layered protocols, commonly referred to as protocol stacks, are described in greater detail with reference to FIG. 24.

Figure 24:
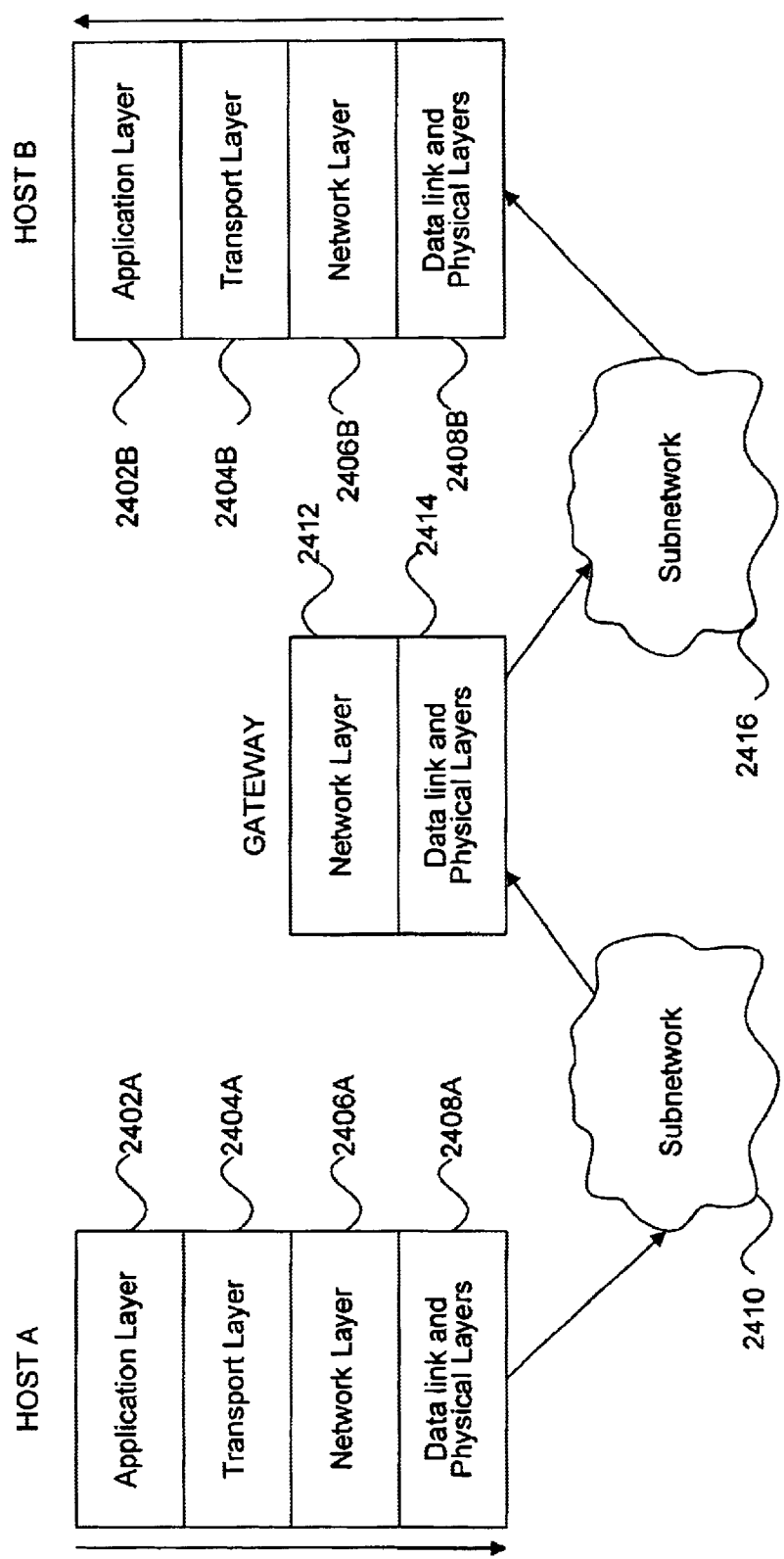
FIG. 24 illustrates the relationship of subnetworks and gateways to layered protocols.

FIG. 24 illustrates the relationship of subnetworks and gateways to layered protocols. Assume that the user application 2402A in host A sends an application protocol data unit (PDU) to an application layer protocol 2402B in host B, such as, for example, a file transfer system. The file transfer software performs a variety of functions and sends file records to the user data. In many systems, the operations at host B are known as server operations and the operations at host A are know as client operations.

As indicated by the downward arrows in the protocol stack at host A, this unit is passed to the transport layer protocol 2404A, which performs a variety of operations and adds a header to the PDU passed to it. At this point, the unit of data is often referred to as a segment. The PDU from the upper layers is considered to be data to the transport layer.

Next, the transport layer passes the segment to the network layer 2406A, also called the IP layer, which again performs specific services and appends a header. This unit (now called a datagram in internet terms) is passed down to the lower layers. Here, the data link layer adds its header as well as a trailer, and the data unit (now called a frame) is launched into subnetwork 2410 by the physical layer 2408A. Of course, if host B sends data to host A, the process is reversed and the direction of the arrows is changed.

Internet protocols are typically unaware of what goes on inside the network. The network manager is free to manipulate and manage the PDU in any manner necessary. In some instances, however, the internet PDU (data and headers) remains unchanged as it is transmitted through the subnet. In FIG. 24, it emerges at the gateway where it is processed through the lower layers 2414 and passed to the IP (network) layer 2412. Here, routing decisions are made based on the destination address provided by the host computer.

After these routing decisions have been made, the PDU is passed to the communications link connected to the appropriate subnetwork (comprising the lower layers). The PDU is re-encapsulated into the data link layer frame and passed to the next subnetwork 2416, where it finally arrives at the destination host.

The destination (host B) receives the traffic through its lower layers and reverses the process that transpired at host A; it de-encapsulates the headers by stripping them off in the appropriate layer. The header is used by the layer to determine the actions it is to perform; the header therefore governs the layer's operations.

The PDU created by the file transfer application in the application service layer is passed to the file transfer application residing at host B. If host A and B are large mainframe computers, this application is likely an exact duplicate of the software at the transmitting host. The application might, however, perform a variety of functions, depending on the header it receives. It is conceivable that the data could be passed to another end-user application at host B, but in many instances the user at host A merely wants to obtain the services of a server protocol, such as a file transfer or e-mail. If this is the case, it is not necessary for an end-user application process to be invoked at host B.

To return the retrieved data from the server at host B to the client at host A, the process is reversed. The data is transferred down through the layers in the host B machine, through the network, through the gateway, to the next network, and up the layers of host A to the end-user.

Figure 25:
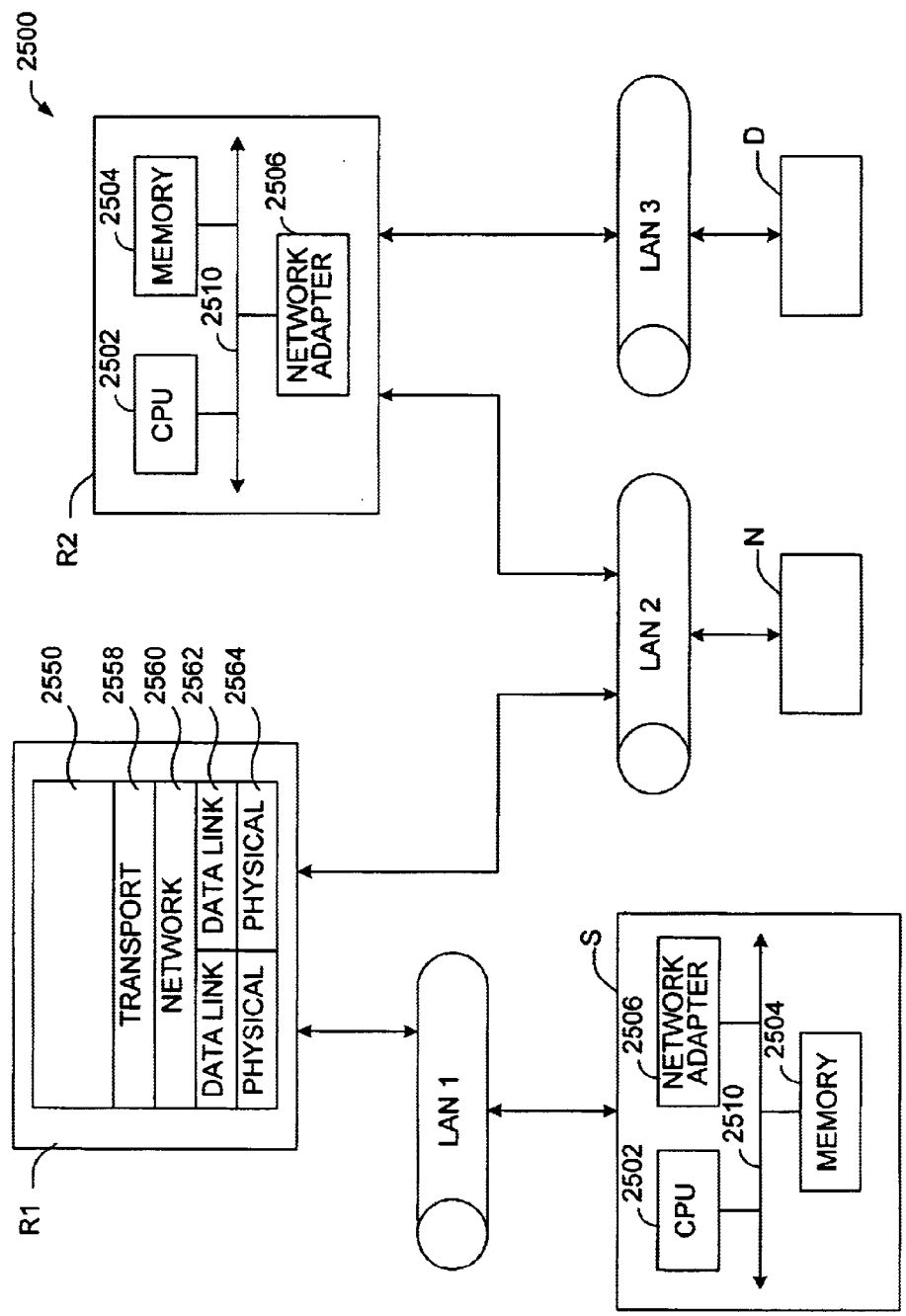
FIG. 25 is a block diagram of a network system comprising a collection of computer networks connected to a plurality of nodes.

FIG. 25 is a block diagram of a network system 2500 comprising a collection of computer networks connected to a plurality of nodes. The nodes are typically general-purpose computers comprising a source node S, an end node N, a destination node D and a plurality of intermediate nodes or routers RI and R2. Each node typically comprises a central processing unit (CPU) 2502, a memory unit 2504 and at least one network adapter 2506 interconnected by a system bus 2510. The memory unit 2504 may comprise storage locations typically composed of random access memory (RAM) devices, which are addressable by the CPU 2502 and network adapter 2506. The memory unit typically provides temporary storage of information, such as, for example, executable processes and contents of data packets, as described further herein. An operating system, portions of which are typically resident in memory and executed by CPU, functionally organizes the node by, inter alia, invoking network operations in support of those processes executing in the CPU.

The computer networks included within system 2500 may range from local area networks (LANs) to wide area networks (WANs). A LAN is a limited area network, while a WAN may be a public or private telecommunications facility that interconnects nodes widely dispersed using communication links. Communication among the nodes coupled to these networks is typically effected by exchanging discrete data "packets" specifying addresses of, e.g., source and destination nodes. Since the system shown in FIG. 25 comprises a relatively small group of interconnected LANs 1–3, it is typically maintained as an autonomous domain. The intermediate nodes, typically routers, are configured to facilitate the flow of data packets throughout the domain 2500 by routing those packets to the proper receiving nodes.

In general, when a source node S transmits a packet over LAN 1, the packet is sent to all nodes on that LAN. If the intended recipient of the packet is connected to LAN 3, the packet is routed through router R1, over LAN 2 and through R2 onto LAN 3. A key function of a router is determining the next node to which the packet is sent; this routing function is typically performed by network layer 2560 of a protocol stack 2550 within each node. Typically, the packet includes two destination addresses: the address of the final destination node and the address of the next node along the route. The final destination address remains constant as the packet traverses the networks along an optimal route, while the next destination address changes as the packet moves from node to node along the optimal route through the networks.

Specifically, when source node S sends a packet to destination node D, i.e., the final destination address, the packet is transmitted onto LAN 1 with a next destination address specifying the address of router R1. Address information embedded in the packet, which is processed by the higher-layer software of the protocol stack 2550, identifies the final destination of the packet as node D. Based on this information, R1 determines that the next node along the optimal path is router R2 and proceeds to pass the packet onto LAN 2 for reception by that node. Router R2 then determines that the next node is the final destination node D and transmits the packet over LAN 3 to node D.

Figure 26:
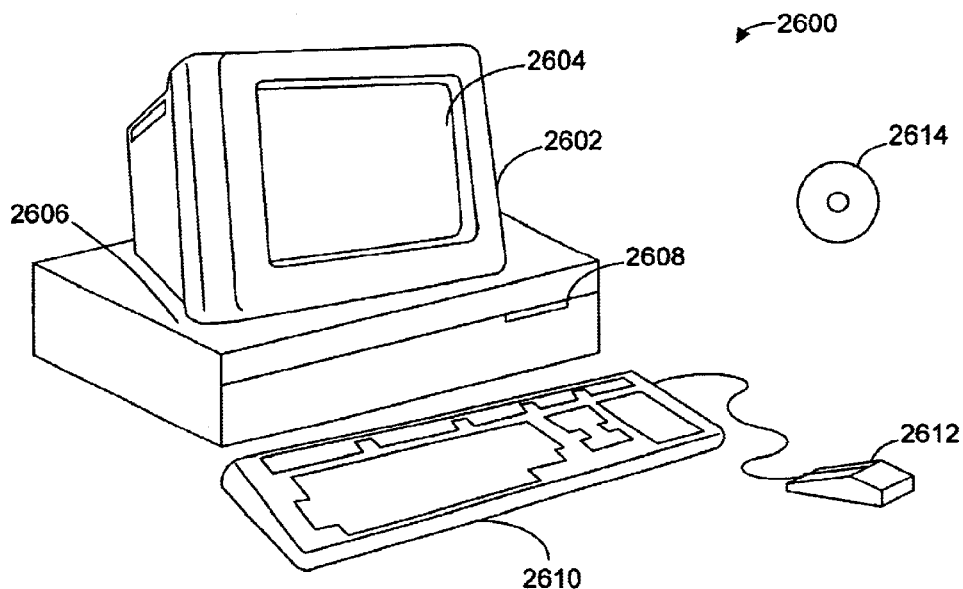
FIGS. 26 and 27 illustrate a computer system suitable for implementing embodiments of the present invention.
Figure 27:
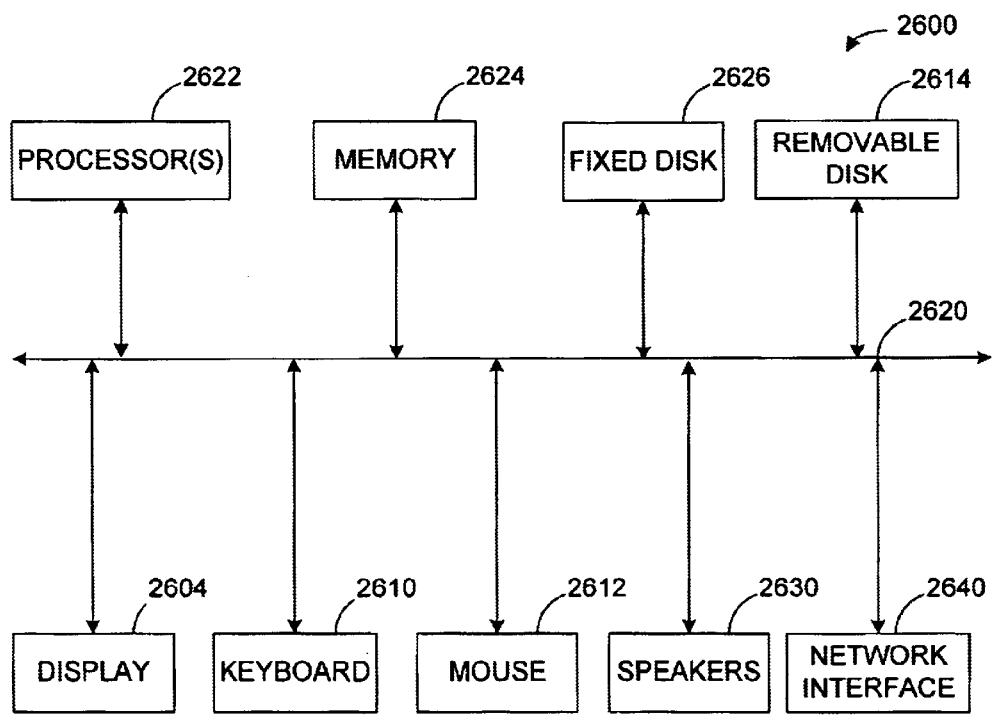

FIGS. 26 and 27 illustrate a computer system 2600 suitable for implementing embodiments of the present invention. FIG. 26 shows one possible physical form of the computer system. Of course, the computer system may have many physical forms ranging from an integrated circuit, a printed circuit board and a small handheld device up to a huge super computer. Computer system 2600 includes a monitor 2602, a display 2604, a housing 2606, a disk drive 2608, a keyboard 2610 and a mouse 2612. Disk 2614 is a computer-readable medium used to transfer data to and from computer system 2600.

FIG. 27 is an example of a block diagram for computer system 2600. Attached to system bus 2620 are a wide variety of subsystems. Processor(s) 2622 (also referred to as central processing units, or CPUs) are coupled to storage devices including memory 2624. Memory 2624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 2626 is also coupled bi-directionally to CPU 2622; it provides additional data storage capacity and may also include any of the computer-readable media described below. Fixed disk 2626 may be used to store programs, data and the like and is typically a secondary storage medium (such as a hard disk) that is slower than primary storage. It will be appreciated that the information retained within fixed disk 2626, may, in appropriate cases, be incorporated in standard fashion as virtual memory in memory 2624. Removable disk 2614 may take the form of any of the computer-readable media described below.

CPU 2622 is also coupled to a variety of input/output devices such as display 2604, keyboard 2610, mouse 2612 and speakers 2630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 2622 optionally may be coupled to another computer or telecommunications network using network interface 2640. With such a network interface, it is contemplated that the CPU might receive information from the network, or might output information to the network in the course of performing the above-described method steps. Furthermore, method embodiments of the present invention may execute solely upon CPU 2622 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, although specific embodiments have been described with reference to residential real estate transactions, it will be understood that the techniques of the present invention may be applied to any type of real estate transaction including commercial real estate transactions. Therefore, the scope of the invention should be determined with reference to the appended claims.

What is claimed is:

1. A computer-implemented method for facilitating a transaction corresponding to real property between a seller and a buyer via a network, the transaction having a plurality of stages, the method comprising:

facilitating via the network a negotiation relating to the real property between the buyer and the seller, the negotiation including an offer by the buyer which is presented to the seller, a counteroffer by the seller in response to the offer, and an acceptance, the offer, the counteroffer, and the acceptance being facilitated via the network, providing access by at least one of the buyer and the seller via the network to a plurality of real estate services, each of the plurality of real estate services relating to an aspect of the transaction, and each of the plurality of real estate services being necessary for the transaction to progress; and automatically providing an economic benefit to at least one of the buyer and the seller for each of selected ones of the plurality of transaction stages upon completion of each selected stage.

2. The method of claim 1 wherein providing access to the plurality of real estate services comprises establishing via the network an escrow account corresponding to the buyer, the seller, and the real property.

3. The method of claim 1 wherein providing access to the plurality of real estate services comprises facilitating securing of financing for the buyer via the network.

4. The method of claim 1 wherein providing access to the plurality of real estate services comprises facilitating inspection of the real property.

5. The method of claim 1 wherein providing access to the plurality of real estate services comprises performing a pre-qualification determination for the buyer relating to financing.

6. The method of claim 1 further comprising providing information corresponding to the real property which is accessible via the network.

7. The method of claim 6 wherein the information comprises a listing describing the real property.

8. The method of claim 6 wherein the information comprises a series of interfaces relating to a neighborhood in which the real property is located.

9. The method of claim 1 wherein facilitating the negotiation comprises enabling the buyer and the seller to negotiate a price for the real property.

10. The method of claim 9 wherein facilitating the negotiation further comprises enabling the buyer and seller to negotiate additional terms.

11. The method of claim 1 wherein providing access to the plurality of real estate services comprises facilitating securing of title insurance for the buyer.

12. The method of claim 1 wherein automatically providing an economic benefit comprises providing a plurality of rebates corresponding to transaction costs in response to specified actions by one of the buyer and the seller.

13. The method of claim 12 wherein the selected stages each have one of the rebates associated therewith, each rebate being applied upon completion of the associated stage by one of the buyer and the seller.

14. The method of claim 1 further comprising providing an interface to one of the buyer and seller by which the one of the buyer and seller may input personal information.

15. The method of claim 14 at least one of the plurality of real estate services requires a portion of the personal information for completing a form related to the at least one of the plurality of real estate services, providing access to the plurality of services comprising automatically populating the form with the portion of the personal information.

16. A computer program product for facilitating a transaction corresponding to real property between a seller and a buyer via a network, the transaction having a plurality of stages, comprising.

a computer readable medium; and computer program instructions stored in the computer readable medium for causing a computer to:

facilitate via the network a negotiation relating to the real property between the buyer and the seller, the negotiation including an offer by the buyer which is presented to the seller, a counteroffer by the seller in response to the offer, and an acceptance, the offer, the counteroffer, and the acceptance being facilitated via the network;

provide access by at least one of the buyer and the seller via the network to a plurality of real estate services, each of the plurality of real estate services relating to an aspect of the transaction, and each of the plurality of real estate services being necessary for the transaction to progress;

automatically provide an economic benefit to at least one of the buyer and the seller for each of selected ones of the plurality of transaction stages upon completion of each selected stage.

* * * * *